(12) United States Patent
Francis et al.

(10) Patent No.: US 11,314,495 B2
(45) Date of Patent: Apr. 26, 2022

(54) IN-VEHICLE SYNTHETIC SENSOR ORCHESTRATION AND REMOTE SYNTHETIC SENSOR SERVICE

(71) Applicant: Amazon Technologies, Inc., Seattle, WA (US)

(72) Inventors: Brett Francis, Redwood City, CA (US); Nicholas Jay Lefler, Canton, GA (US)

(73) Assignee: Amazon Technologies, Inc., Seattle, WA (US)

(*) Notice: Subject to any disclaimer, the term of this patent is extended or adjusted under 35 U.S.C. 154(b) by 193 days.

(21) Appl. No.: 16/835,070

(22) Filed: Mar. 30, 2020

(65) Prior Publication Data
US 2021/0302941 A1    Sep. 30, 2021

(51) Int. Cl.
G06F 15/177    (2006.01)
G06F 8/61    (2018.01)
G05B 19/418    (2006.01)

(52) U.S. Cl.
CPC ........... *G06F 8/61* (2013.01); *G05B 19/4188* (2013.01)

(58) Field of Classification Search
CPC .............................. G06F 8/61; G05B 19/4188
See application file for complete search history.

(56) References Cited

U.S. PATENT DOCUMENTS

| 8,705,527 | B1 | 4/2014 | Addepalli et al. | |
|---|---|---|---|---|
| 2016/0314224 | A1* | 10/2016 | Wei | G06F 30/20 |
| 2016/0349400 | A1* | 12/2016 | Chen | E21B 47/113 |
| 2018/0046869 | A1* | 2/2018 | Cordell | G06K 9/00845 |
| 2018/0266856 | A1* | 9/2018 | Broadley | G01D 18/008 |
| 2019/0179979 | A1* | 6/2019 | Melick | G06F 30/20 |
| 2019/0302259 | A1* | 10/2019 | Van Fleet | G05D 1/0255 |
| 2020/0074266 | A1* | 3/2020 | Peake | G01S 17/931 |
| 2020/0089487 | A1* | 3/2020 | Ramic | G06F 8/61 |
| 2021/0019457 | A1* | 1/2021 | Brown | G06F 30/15 |

FOREIGN PATENT DOCUMENTS

WO    2020047016 A1    5/2020

OTHER PUBLICATIONS

U.S. Appl. No. 16/581,571, filed Sep. 24, 2019, Michael Christopher Wenneman et al.

(Continued)

*Primary Examiner* — Oleg Survillo
(74) *Attorney, Agent, or Firm* — Robert C. Kowert; Kowert, Hood, Munyon, Rankin & Goetzel, P.C.

(57) ABSTRACT

A system comprising one or more computers implements a synthetic sensor service configured to deploy synthetic sensors to an in-vehicle computing device implementing a synthetic sensor orchestration environment for a vehicle. The synthetic sensor orchestration environment determines a placement decision for a new synthetic sensor to be added to the vehicle based on one or more annotations included in a synthetic sensor package for the new synthetic sensor. The synthetic sensor service and respective synthetic sensor orchestration environments implemented in various types of vehicles provide a consistent way to remotely add additional synthetic sensors and/or other functionality to different types of vehicles after the vehicles have already been put in use by respective owners or operators of the vehicles.

23 Claims, 14 Drawing Sheets

(56) References Cited

OTHER PUBLICATIONS

U.S. Appl. No. 16/453,921, filed Jun. 26, 2019, Marco Argenti.
U.S. Appl. No. 17/037,376, filed Sep. 29, 2020, Michael Garcia, et al.
International Search Report and Written Opinion dated Jun. 11, 2021 in PCT/US2021/023067, Amazon Technologies, Inc, pp. 1-12.
Sayfan, Gigi, "Matering Kubernetes," May 17, 2017, Packt Publishing Ltd., Birmingham UK.
Sami, Hani, et al "Vehicular-OBUs-As-On-Demand-Fogs: Resource and Context Aware Deployment of Containerized Micro-Services", IEEE /ACM Transactions On Networking, Mar. 11, 2020, pp. 778-790, vol. 28, No. 2, New York, NY, US.
Esen, Hasan, et al., "Control as a Service (CaaS): Cloud-based Software Architecture for Automotive Control Applications," Proceedings of the Second International Workshop On the Swarm at the Edge of the Cloud [Online], Apr. 13, 2015, pp. 13-18, New York, NY, USA, ISBN: 978-1-4503-3595-9; Retrieved from the Internet: URL:https://dl.acm.org/doi/pdf/10.1145/2756755.2756758 [retrieved on Nov. 18, 2021].

\* cited by examiner

OEM A- Vehicle Control Console  
Model Year Selected: 2009, 2010, 2011  
Platform: B-IVI1.2  
Trim: Premium, Premium plus Current Date: Nov-12, 2021  
Effective Date: Jan 1, 2022  
Termination Date: N/A

[Test] [Deploy]

Sensor Access | System Access | Compute Unit Control

| | 1P Apps | 2P Apps | 3P Apps | Autosar Apps | Manual Selection |
|---|---|---|---|---|---|
| Vehicle Safety Sensors | ○ | ○ | ○ | ● | Select Apps |
| Forward Facing Camera Sensor | ● | ● | ○ | ● | Select Apps |
| Rear Facing Camera Sensor | ● | ● | ○ | ● | Select Apps |
| Side Collision Warning Sensor | ● | ○ | ○ | ● | Select Apps |
| ABS Event Sensor | ○ | ○ | ○ | ● | Select Apps |
| Air Bag Deployment Sensor | ○ | ○ | ○ | ● | Select Apps |
| Interior Cabin Sensors | ● | ○ | ○ | ● | Select Apps |
| Seat Weight Sensors | ● | ● | ○ | ● | Select Apps |
| Driver Facial Camera Sensor | ● | ○ | ○ | ● | Select Apps |
| Cabin Temperature Sensor | ● | ● | ● | ● | Select Apps |
| Vehicle Status Sensors | ○ | ○ | ○ | ● | Select Apps |
| Fuel Level Sensor | ● | ● | ● | ● | Select Apps |
| Battery Level Sensor | ● | ○ | ○ | ● | Select Apps |
| Engine Temperature Sensor | ○ | ○ | ○ | ● | Select Apps |
| GPS Sensor | ● | ● | ● | ● | Select Apps |
| Speed and Heading Sensor | ● | ○ | ○ | ● | Select Apps |

FIG. 6

IN-VEHICLE SYNTHETIC SENSOR ORCHESTRATION AND REMOTE SYNTHETIC SENSOR SERVICE

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicle. In order to guarantee a high level of safety, such sensors and control algorithms are rigorously tested and certified to meet different performance levels, such as automotive safety integrity levels (ASIL levels). For example, depending on the criticality of a sensor or an algorithm, a higher or lower certification level may be required.

Some vehicles may include multiple operating systems, or an operating system with multiple domains, where the different operating systems or domains are certified at different respective performance levels. For example, in some vehicles a radio may be part of an entertainment operating system domain that may not be required to meet ASIL certification requirements, while sensors for seat belts and air bags may be included in a safety operating system domain that requires a high ASIL certification level. In such vehicles, the different operating systems/operating system domains may be independent of one another or may share only a limited amount of data between the operating systems/domains. For example, electronic sensor information related to a seat belt may not be accessible in the entertainment operating system domain, and vice versa, a radio volume level may not be accessible in the safety operating system domain.

Additionally, vehicles are often manufactured with fixed control algorithms and fixed rules for sharing electronic sensor data between operating systems or domains, wherein it is burdensome or time-consuming to change or update the fixed algorithms and/or fixed rules for sharing electronic sensor data.

BRIEF DESCRIPTION OF THE DRAWINGS

FIG. 6 illustrates an example client console of a synthetic sensor service, according to some embodiments.

Figure 1:
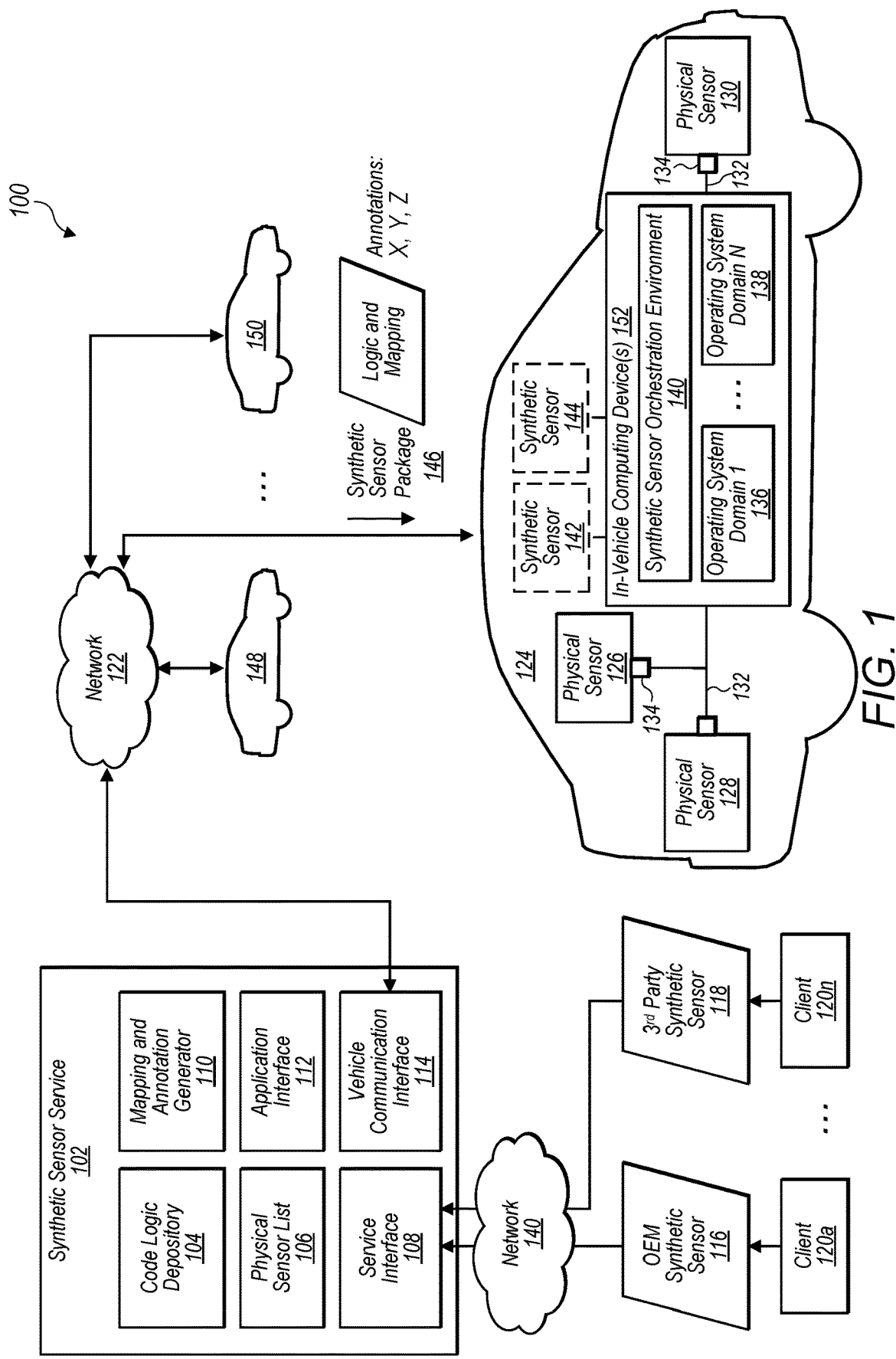
FIG. 1 illustrates a synthetic sensor service that receives instructions for deploying synthetic sensors from clients of the synthetic sensor service and that remotely causes synthetic sensors to be deployed to vehicles that each respectively include an in-vehicle synthetic sensor orchestration environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a synthetic sensor service and implementing in-vehicle synthetic sensor orchestration environment that enable clients of the synthetic sensor service to deploy synthetic sensors in vehicles that have already been made available for use by operators of the vehicles. For example a vehicle manufacturer, a vehicle parts manufacturer, or another third party may develop new applications that use new types of synthetic sensors and may deploy such new types of applications and/or synthetic sensors into vehicles that have already been sold to consumers. The deployment of the new types of synthetic sensors may be achieved remotely over a network connection between the synthetic sensor service and the vehicle, wherein an in-vehicle computing device of the vehicle implements a synthetic sensor orchestration environment that determines placement for the new synthetic sensor and that further performs configuration operations to enable required input data to flow to the new synthetic sensor from existing physical sensors or from other synthetic sensors in the vehicle. The synthetic sensor orchestration environment also performs configuration operations to enable output data from the new synthetic sensor to flow to output destinations for the new synthetic sensor.

In some embodiments, in addition to, or instead of, using the synthetic sensor service to deploy synthetic sensors to vehicles that have already been made available for use by operators of the vehicles, a client, such as a vehicle manufacturer, may use the synthetic sensor service to deploy synthetic sensors to a vehicle during the manufacturing process for the vehicle. For example, during a portion of the manufacturing process for the vehicle, after an on-board computing system has been installed and connected to a communication bus of the vehicle, synthetic sensors may be deployed to a synthetic sensor orchestration environment in order to perform quality assurance tests for electronic systems of the vehicle and/or provide output data from synthetic sensors for use in manufacturing and testing the vehicle.

In some embodiments, a system includes one or more computing devices storing program instructions for implementing a synthetic sensor service for vehicles. The program instructions, when executed by the one or more computing devices, cause the one or more computing devices to implement an interface for receiving instructions for one or more synthetic sensors that are to be deployed to a vehicle during a manufacturing process or subsequent to the vehicle being made available for use by an operator of the vehicle. The program instructions, when executed by the one or more computing devices, further cause the one or more computing devices to receive, via the interface, a selection of one or more synthetic sensors to be deployed to the vehicle, wherein the interface indicates, for the selected one or more synthetic sensors, a mapping that maps the one or more synthetic sensors to one or more existing physical sensors or other synthetic sensors of the vehicle. Additionally, the program instructions, when executed by the one or more computing devices, cause the one or more computing devices to provide, based on the received selection, the one or more selected synthetic sensor packages for deployment to a synthetic sensor orchestration environment of the vehicle, wherein the provided one or more synthetic sensor packages comprise code defining logic elements and mappings for the respective one or more synthetic sensors and one or more respective annotations defining inputs, outputs, or attributes of the respective one or more synthetic sensors, wherein the code is included in an enveloped format with the one or more annotations outside of a code envelope In some embodiments, a system includes one or more computing devices, configured to be installed in a vehicle, wherein the one or more computing devices store program instructions for implementing a synthetic sensor orchestration environment in the vehicle. The synthetic sensor orchestration environment is configured to receive, from a synthetic sensor service, a synthetic sensor package comprising code defining logic for a synthetic sensor and one or more annotations defining inputs, outputs, or attributes of the synthetic sensor. The code for the synthetic sensor is included in an enveloped format with the one or more annotations outside of a code envelope. The synthetic sensor orchestration environment is also configured to determine, based on the one or more annotations, a particular operating system domain for implementing the synthetic sensor. Additionally, the synthetic sensor orchestration environment is configured to perform one or more configuration operations to enable the synthetic sensor to have access to input data from a physical sensor or other synthetic sensor of the synthetic sensor orchestration environment.

In some embodiments, one or more non-transitory, computer-readable storage media, store program instructions that, when executed on or across one or more computing devices, cause the one or more computing devices to receive a synthetic sensor package comprising code defining logic for a synthetic sensor and one or more annotations defining inputs, outputs, or attributes of the synthetic sensor, wherein the code is included in an enveloped format with the one or more annotations outside of a code envelope. The program instructions also cause the one or more computing devices to determine, based on the one or more annotations, a particular operating system domain for implementing the synthetic sensor. Additionally, the program instructions cause the one or more computing devices to perform one or more configuration operations to enable the synthetic sensor to have access to input data from one or more physical sensors or synthetic sensors of the vehicle included in the particular operating system domain.

Vehicles are often manufactured with electronic sensors and computing devices that execute control algorithms that take sensor data from the electronic sensors as inputs to the control algorithms. However, communication interfaces for electronic sensors used in vehicles often vary between different vehicle manufacturers and even vary amongst different models manufactured by the same vehicle manufacturer. Additionally, electronic sensors and associated control algorithms are often implemented as separate systems that serve a particular purpose for the vehicle, but that are not configured to share sensor data with other systems of the vehicle. For example, an entertainment system of a vehicle may be implemented with electronic sensors, such as volume controls, but may not be configured to share sensor data with other systems of the vehicle. In some instances, this is done because separate systems of a vehicle have different certification requirements, such that the separate systems are kept separate and certified separately based on separate hardware requirements and separate control algorithm requirements.

Also, vehicles are often manufactured with fixed algorithms and rules for sharing sensor data, such that it is burdensome and/or time consuming to change the fixed algorithms or rules for sharing sensor data. For example, the algorithms and rules for sharing data are often determined during the design phase of the vehicle and cannot be changed after the vehicle has been manufactured, or may require physically changing out parts, such as computing devices, to change the fixed algorithms or rules for sharing sensor data.

For example, changing the algorithms or rules for sharing sensor data may require a vehicle owner to take the vehicle into a service department and physically change out a vehicle computer programmed with a certain set of algorithms and/or rules for sharing sensor data with another vehicle computer with a different configuration. These obstacles may prevent deployment of new applications and sensors into a vehicle, wherein the new applications and sensors take advantage of relationships between sensor data already being collected by electronic sensors installed on the vehicle to determine new functionality or new features for the vehicle.

For example, a vehicle may be manufactured with a seat weight sensor to determine whether or not a person is sitting in a seat of the vehicle. The seat weight sensor may be included in a safety domain of the vehicle and may be used in an alarm to fasten seat belts. Additionally, the vehicle may include a cabin camera that is used by another layer of the safety domain of the vehicle to detect driver distraction or drowsiness. However, the different layers of the safety domain may be separated such that the two domains do not share information. This may be due to the fact that the distraction/drowsiness layer is certified at a lower level of certification than the seat belt layer of the safety domain, wherein the different certification levels require different types of hardware components to implement the program algorithms for the respective domains. However, an OEM manufacturer, an OEM parts manufacturer, or other third party may determine that sensor data from the seat weight sensor and the cabin camera may be combined to determine whether a child is seated in the seat. Additionally, other applications may use the fact that a child is seated in the seat to improve functionality. For example, an entertainment system may customize entertainment options made available to the seat occupant based on the knowledge that a child, instead of an adult, is seated in the seat.

While the infotainment domain and the safety domain may not separately be configured to provide this functionality, a synthetic sensor orchestration environment, as described herein, may enable the OEM manufacturer, the OEM parts manufacturer, or the third party to deploy a "child seated in seat?" synthetic sensor into a synthetic sensor orchestration environment that allows and/or disallows flows of sensor data from existing physical sensors in the same or different domains to flow to a new synthetic sensor and that further allows the addition of new logical code for the new synthetic sensor that uses the sensor data from the existing physical sensors to determine new outputs, such as a "child seated in seat, yes or no?" output. In this example, the output of the synthetic sensor may then be an input to the infotainment system that is used to customize content provided to the occupant of the seat based on the knowledge that the occupant is a child. While this is a particular example of the use of a synthetic sensor implemented in a synthetic sensor orchestration environment, various other inputs from various other types of existing physical sensors may be used as inputs to a synthetic sensor to determine new types of outputs that are useful in providing new features in a vehicle.

As another example, a synthetic sensor service may provide one or more synthetic sensor packages to a vehicle during a manufacturing process of the vehicle subsequent to installation in the vehicle of one or more computing devices storing program instructions for implementing a synthetic sensor orchestration environment. The one or more synthetic sensors may be configured to generate outputs used to test the vehicle during the manufacturing process. For example, the synthetic sensors may test other components of the vehicle to determine the components are properly installed and configured in the vehicle.

Additionally, such a synthetic sensor orchestration environment may enable new synthetic sensors to be easily added to a vehicle via deployment over a network connection. For example, a synthetic sensor package may be deployed into the synthetic sensor orchestration environment, without requiring any physical hardware to be changed out on the vehicle and without requiring the vehicle to be brought into a service department to be re-programmed. Additionally, a synthetic sensor orchestration environment may sit on top of existing operating system domains, such as a vehicle controls domain, safety domain, infotainment domain, etc., such that the synthetic sensor orchestration environment receives sensor data from sensors in the respective domains, but does not alter code logic or algorithms in the respective domains and does not otherwise degrade the certification levels of the respective domains and the electronic sensors in the respective domains. For example, adding the "child seated in seat, yes or no?" synthetic sensor may not alter or degrade the seat weight sensor or the algorithms of the safety domain that utilize the seat weight sensor to indicate a fasten seat belt alarm.

Moreover, in some embodiments, a synthetic sensor service may provide a uniform deployment mechanism for synthetic sensors into vehicles with varying electronic sensor interfaces. For example, synthetic sensor orchestration environments in different types of vehicles may include interfaces that allow or disallow sensor data to flow from physical sensors in the different types of vehicles, but may be configured to receive common synthetic sensor packages deployed from a synthetic sensor service. For example, a first vehicle manufacturer and a second vehicle manufacturer may use different types of seat weight sensors that have different communication interfaces. However, a synthetic sensor orchestration environment in each of the different types of vehicles may be configured to receive a common synthetic sensor package for the "child seated in seat, yes or no?" synthetic sensor, and locally determine a placement of the synthetic sensor and configuration operations that need to be taken to allow data from existing sensors to flow to the new synthetic sensor. Thus, a third party developer may develop a single version of a "child seated in seat, yes or no?" synthetic sensor and use a synthetic sensor service to deploy the new "child seated in seat, yes or no?" synthetic sensor into synesthetic sensor orchestration environments in multiple different types of vehicles having varying sensor communication interfaces, wherein placement is determined locally in the respective synthetic sensor orchestration environments.

Additionally, in some embodiments, a synthetic sensor package that is to be deployed from a synthetic sensor service to a synthetic sensor orchestration environment in a vehicle may include one or more annotations that are outside of an envelope of the synthetic sensor package that envelopes the control logic and mappings for the new synthetic sensor. Such annotations may be used by a synthetic sensor orchestration environment to determine a placement for the new synthetic sensor. Additionally, the annotations may be used by the synthetic sensor orchestration environment to further determine effects the placement of the new synthetic sensor in a particular system domain will have on other synthetic sensors. For example, a newly placed synthetic sensor may provide an output that is listed in an annotation of another synthetic sensor as an optional input, wherein the presence of the optional input allows the other synthetic sensor to be upgraded to a higher certification level, or to otherwise provide more reliable outputs.

For example, the annotations may be included in a synthetic sensor package as metadata that is external from the code itself (e.g. logic elements and mappings) of the new synthetic sensor. Thus a synthetic sensor orchestration environment may read the annotations included in metadata of the synthetic sensor package to determine a placement decision for the new synthetic sensor without having to parse the code (e.g. logic elements and mappings) of the new synthetic sensor that is included within the envelope to determine a placement decision.

In some embodiments, a synthetic sensor may include code that uses sensor data from existing sensors to determine a new synthetic sensor output. Also, in some embodiments, a synthetic sensor may include one or more machine learning models that use sensor data from existing sensors to determine a new synthetic sensor output. For example, a machine learning model may be a logic element of a synthetic sensor, wherein physical sensor inputs or other inputs are mapped to the machine learning model and an output of the machine learning model is further used by the synthetic sensor to determine an output of the synthetic sensor.

In some embodiments, an OEM manufacturer, an OEM parts manufacturer, and/or a third-party developer may develop new applications for a vehicle that use new types of synthetic sensors. In such embodiments, a client may purchase a new application from the application store, and the application store may provide a suggestion to an OEM of the vehicle to instruct a synthetic sensor service to deploy one or more synthetic sensor packages to the vehicle of the client in order to implement the purchased new application. In some embodiments, a synthetic sensor service and respective synthetic sensor orchestration environments in different vehicles may provide a consistent perspective for controlling sensor data to be used in updated code after the vehicle has been manufactured and/or put into service by a consumer. For example, a synthetic sensor orchestration environment may enable sensor data to be shared horizontally in a vehicle as opposed to being limited to multiple separate vertically oriented control domains.

For example, an OEM manufacturer, an OEM parts manufacturer, or another third-party may use a console of a synthetic sensor service to develop new synthetic sensors. The developer of the synthetic sensor (e.g. OEM manufacturer, OEM parts manufacturer, or third-party) may select sensor data to use as inputs for the synthetic sensor from a list of sensor data types available from existing sensors. The developer may also select logic elements such as algorithms (e.g. rules) or models (e.g. machine learning models) to receive selected inputs. The developer may further determine mappings between the inputs, the logic elements (e.g. the rules and/or the models), to an output of the new synthetic sensor. In some embodiments, the mappings may be represented as JSON objects or XML code, wherein a synthetic sensor orchestration environment in a vehicle to which a package for the new synthetic sensor is deployed parses the JSON objects or XML code to determine relationships between inputs, logic elements (e.g. rules and/or models), and outputs. The synthetic sensor orchestration environment may then cause one or more configuration operations to take place to implement the logic elements (e.g. rules and/or models) mapped to in the code logic of the synthetic sensor package. The synthetic sensor orchestration environment may further cause one or more additional configuration operations to be taken to allow sensor data to flow to components of the synthetic sensor according to the mapping included in the code logic of the synthetic sensor package. In some embodiments, the logic elements and mapping may be included in an enveloped environment and one or more annotations stored as metadata of the synthetic sensor package (outside of the envelope) may indicate characteristics of the synthetic sensor such as required inputs, optional inputs, outputs, certification levels, synthetic sensor dependencies, failure modes, etc.

In some embodiments, an OEM manufacturer, an OEM parts manufacturer, or another third party may use a service interface that includes the console or that is separate from the synthetic sensor design console to instruct the synthetic sensor service to deploy one or more synthetic sensors to a particular vehicle or class of vehicles that qualify to receive the synthetic sensor. For example, an OEM manufacturer, an OEM parts manufacturer, or another third party may require a consumer to purchase an upgrade package in order to have access to new types of features that are enabled using new types of synthetic sensors.

In some embodiments, sets of synthetic sensors may be grouped together to perform more sophisticated functions. For example, in some embodiments, an output of a first synthetic sensor may be an input to another synthetic sensor. Also, in some embodiments, a synthetic sensor orchestration environment in a vehicle may be configured to share, via a network connection, at least some of the vehicle sensor data with a storage service or other cloud service of a provider network via a network connection between the vehicle and the provider network. For example, sensor data from a vehicle may be provided to a machine learning service of a provider network to determine improved control relationships, wherein the results of the machine learning are then used to implement a new function or synthetic sensor in the vehicle. In some embodiments, machine learning may be used in loop with a control algorithm of the vehicle, or may be used to determine control relationships that are then converted into static, auditable code to be deployed to the vehicle. Also, in some embodiments, clients, such as OEMs, may operate data storage facilities and a synthetic sensor orchestration environment in a vehicle may be configured to share, via a network connection, at least some of the vehicle sensor data with an OEM data storage facility.

In some embodiments, synthetic sensors may be developed and controlled by an OEM manufacturer and/or an OEM parts manufacturer to guarantee synthetic sensors deployed to vehicles manufactured by the OEM or OEM parts manufacturer satisfy particular quality and/or certification requirements. While in other embodiments, other third parties may be enabled to develop and deploy new types of synthetic sensors into vehicles manufactured by another party, such as the OEM or multiple different OEMs.

In some embodiments, various domains or operating systems included in a vehicle may include an infotainment domain/OS, a cockpit or control domain/OS, a communications domain/OS, a safety system domain/OS, a vehicle server domain/OS, a telematics communication unit domain/OS, an advanced drive assistance system domain/OS, a cloud domain/OS, an edge processing domain/OS (which may be implemented in part in a cellular communications tower, etc.), and/or a gateway domain/OS. The vehicle may include a common communications bus, but the different domains may be separate branches off of the bus, or data flowing over the bus may not be accessible in all of the domains.

In some embodiments, a synthetic sensor orchestration environment may provide an output from a synthetic sensor to another vehicle system outside of the synthetic sensor orchestration environment. In some embodiments, the other vehicle system may take one or more control actions based on the output received from the synthetic sensor. For example, if the synthetic sensor is a synthetic sensor that determines whether or not a passenger is seated in the front seat, an output of the synthetic sensor may be provided to a vehicle system outside of the synthetic sensor orchestration environment, such as a front seat adjustment mechanism controller, wherein the front seat adjustment mechanism controller causes the front seat to automatically move forward if no one is sitting in the front seat such that passengers in the back seat have more leg room.

In some embodiments, a synthetic sensor orchestration environment may provide an output from a synthetic sensor to a remote system outside of the vehicle. For example, a portion of an infotainment system for a vehicle may be implemented remotely using cloud-based resources and the output of the synthetic sensor may be provided to a cloud provider outside of the vehicle. As an example, an output of a "child seated in vehicle?" synthetic sensor may be provided to a remote server that customizes media content to be provided to the vehicle, wherein different customizations of the media content may be performed based on whether or not a child is seated in the vehicle.

FIG. 1 illustrates a synthetic sensor service that receives instructions for deploying synthetic sensors from clients of the synthetic sensor service and that remotely causes synthetic sensors to be deployed to vehicles that each respectively include an in-vehicle synthetic sensor orchestration environment, according to some embodiments.

In some embodiments, a synthetic sensor service for vehicles, such as synthetic sensor service 102, is configured to receive instructions for defining new synthetic sensors from clients, such as clients 120a through 120n, via a network, such as network 140. In some embodiments, clients 120a through 120n may include vehicle original equipment manufacturers (e.g. vehicle OEMs), vehicle parts original equipment manufacturers (e.g. parts OEMs), or third parties, such as application developers, etc.

In some embodiments, a synthetic sensor service 102 may generate a synthetic sensor package 146 based on the instructions received from any one of the clients 120a through 120n and deploy the synthetic senor package to a synthetic sensor orchestration environment 140 of one or more vehicles, such as vehicles 124, 148, 150, etc., via a network 122. For example, network 122 may be a wireless network, such as a cellular, satellite or other network that allows data communications between the synthetic sensor service 102 and an in-vehicle computing system 152 that implements a synthetic sensor orchestration environment 140.

In some embodiments, a synthetic sensor service, such as synthetic sensor service 102, may include a code logic depository 104, a physical sensor list 106, a service interface 108, a mapping and annotation generator 110, an application interface 112, and a vehicle communication interface 114.

In some embodiments, the service interface of a synthetic sensor service, such as service interface 108, may implement a service console, such as shown in FIG. 6, an application programmatic interface configured to receive synthetic sensor instructions from clients 120a through 120n, a command line interface, a graphical user interface, or other suitable interface that enables clients to select and/or design new synthetic sensors to be deployed to vehicles that include synthetic sensor orchestration environments. Note in some embodiments, a vehicle, such as vehicle 124, may be manufactured to include synthetic sensor orchestration environment 140 at the time of manufacture, wherein the synthetic sensor orchestration environment 140 enables new synthetic sensors to be deployed to vehicle 124 subsequent to manufacture and subsequent to being put into use by an owner or operator of the vehicle 124.

In some embodiments, a console implemented by service interface 108 may provide clients 120 with available sensors included in a vehicle that may be used to design a new synthetic sensor. For example, physical sensor list 106 may store updated lists of available sensors that are included in various types of vehicles that subscribe to the synthetic sensor service 102. Also, a console implemented by service interface 108 may provide clients with available rules, models, etc. that may be used to design a synthetic sensor. For example, code logic depository 104 may store logic elements such as available rules, models, etc. that may be used to define code logic for a new synthetic sensor. Additionally, in some embodiments clients may submit client generated rules, models, etc. to be used in a new synthetic sensor. In some embodiments, service interface 108 may provide a "drag and drop" graphical user interface (GUI), wherein a client drags and drops logic elements, such as rules models, etc. to be used in a new synthetic sensor and further defines a data flow through the new synthetic sensor by drawing lines connecting inputs to the logic elements and further connecting the logic elements to one or more outputs of the synthetic sensor. In some embodiments, a client may select from pre-defined logic elements to drag and drop to define a new synthetic sensor, or the client may provide a client defined logic element to drag and drop and to further connect with other code elements, inputs, outputs, etc. to define a new synthetic sensor.

In some embodiments, mapping and annotation generator 110 may then generate a synthetic sensor package as defined by the client via service interface 108. In some embodiments, the client may specify annotations to be included with the synthetic sensor package, or mapping and annotation generator 110 may automatically determine annotations based on the synthetic sensor definition received via service interface 108.

In some embodiments, an application may request a synthetic sensor be deployed in order to enable the application to be implemented in a vehicle and application interface 112 may receive such a request.

In some embodiments, vehicle communication interface 114 may establish a network connection with in-vehicle computing device(s) 152 and may transmit synthetic sensor package 146 to synthetic sensor orchestration environment 140 for deployment.

In some embodiments, a vehicle such as any of vehicles 124, 148, 150, etc. may include one or more in-vehicle computing devices 152 that implement one or more operating system domains, such as operating system domains 136 through 138. Additionally, in-vehicle computing devices 152 may implement synthetic sensor orchestration environment 140 that spans one or more operating system domains, such as operating system domains 136 and 138. In some embodiments, each operating system domain may be implemented on a separate in-vehicle computing device, or may be implemented on a common in-vehicle computing device. Also, in some embodiments, synthetic sensor orchestration environment 140 may be implemented on a same in-vehicle computing device as one or more of the operating system domains, or may be implemented on a separate in-vehicle computing device that interfaces with other in-vehicle computing devices implementing the respective operating system domains 136 through 138. Also, in some embodiments, a vehicle may include a communication bus 132 that connects the in-vehicle computing devices 152 to physical sensors, such as physical sensors 126, 128, and 130. In some embodiments, one or more different types of interfaces 134 may connect the physical sensors to the communication bus 132. Also, in some embodiments, synthetic sensor orchestration environment 140 may implement one or more synthetic sensors, such as synthetic sensors 142 and 144. In some embodiments the synthetic sensors may be implemented in a particular operating system domain, or may be allowed to communicate with other portions of the vehicle via a communication bus, such as communication bus 132.

Figure 2:
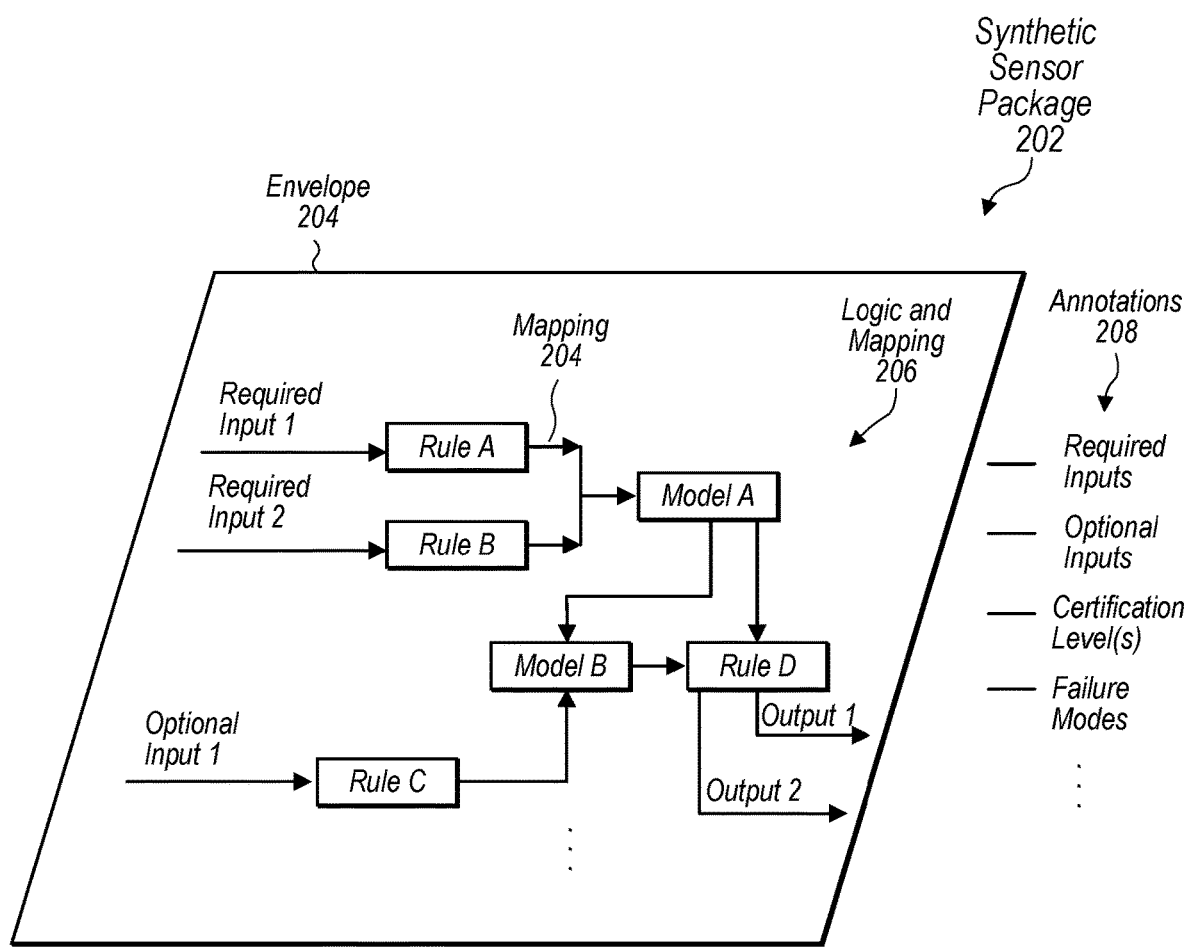
FIG. 2 illustrates a more detailed view of a synthetic sensor package that may be deployed from a synthetic sensor service to an in-vehicle synthetic sensor orchestration environment, wherein the synthetic sensor packages includes code logic and mappings in an envelope of the synthetic sensor package and that also includes annotations for the synthetic sensor outside of the envelope, according to some embodiments.

FIG. 2 illustrates a more detailed view of a synthetic sensor package that may be deployed from a synthetic sensor service to an in-vehicle synthetic sensor orchestration environment, wherein the synthetic sensor packages includes code logic and mappings in an envelope of the synthetic sensor package and that also includes annotations for the synthetic sensor outside of the envelope, according to some embodiments.

In some embodiments, a synthetic sensor package, such as synthetic sensor package 146 described in FIG. 1, may include a similar format as described in FIG. 2 for synthetic sensor package 202.

Synthetic sensor package 202 includes an envelope 204 that envelopes code defining logic and mapping 206. Also, outside of the envelope 104, synthetic sensor package 202 includes annotations 208. In some embodiments, annotations may include required inputs for a synthetic sensor, optional inputs for the synthetic sensor, certification level(s) of the synthetic sensor, failure contingency plans for the synthetic sensor, dependency chains for the synthetic sensor, etc. In some embodiments, a failure contingency plan may indicate an alternative input to be used by the synthetic sensor if a particular required or optional input is not available. Also, the certification levels and/or failure contingency plans may indicate different certification levels to be attributed to the synthetic sensor based on how many required and/or optional inputs are available. Also, a certification level for a synthetic sensor may depend on a domain in which the synthetic sensor is implemented. For example, hardware used in a safety domain may be more robust than hardware used in an entertainment domain. Thus, in order to achieve a higher level of certification the synthetic sensor may need to be implemented in a domain that includes more robust hardware that meets requirements for a given certification level.

In some embodiments, logic elements, such as rules A, B, C, and D and models A and B may have been selected from a code logic depository 104 as described in FIG. 1. Also, in some embodiments one or more of rules A, B, C, or D or models A or B may have been provided by a client 120. Mappings 204 may define data flow between the required and optional inputs, the outputs, and the rules A, B, C, and D and models A and B. In some embodiments a client may draw the lines for mappings 204 using service interface 108 to define a synthetic sensor type.

In some embodiments, annotations 208 may additionally indicate that the synthetic sensor output is an input to another type of synthetic sensor and/or may indicate that an output from another type of synthetic sensor is a required or optional input to the given synthetic sensor. In some embodiments, the annotations may indicate a particular operating system domain in which the synthetic sensor is to be deployed. For example, to achieve a particular certification level the synthetic sensor may need to be deployed in an operating system domain with hardware or processes that satisfy requirements of the particular certification level.

Also annotations, such as annotations 208, may indicate that when one or more optional inputs are available the given synthetic sensor can be upgraded to a higher certification level. In some embodiments, a synthetic sensor orchestration service may scan annotations of already implemented synthetic sensors when a new synthetic sensor is added to determine if the new synthetic sensor is an optional input to one or more of the already implemented synthetic sensors. Also, the synthetic sensor orchestration environment may automatically change a placement of one or more synthetic sensors (e.g. re-shuffle the synthetic sensors) such that given ones of the synthetic sensors can be upgraded to higher certification levels by taking advantage of the output of the newly added synthetic sensors as an input to the one or more already implemented synthetic sensors. In some embodiments, the upgrade of a given synthetic sensor certification level may further allow other synthetic sensors to be upgraded by receiving an input (output from the upgraded synthetic sensor) that complies with a higher certification level.

Figure 3:
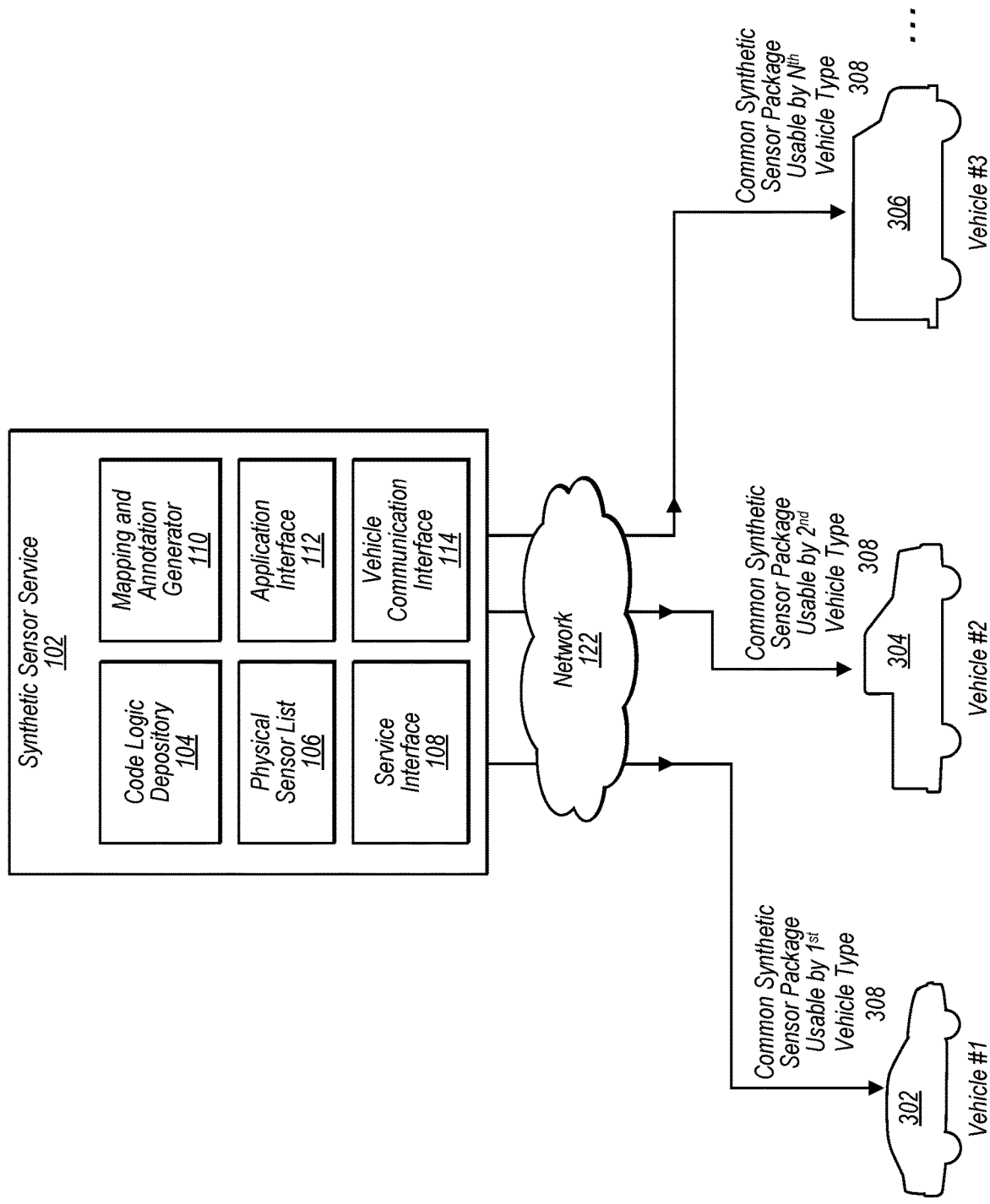
FIG. 3 illustrates a synthetic sensor service that is configured to deploy a common synthetic sensor package to varying types of vehicles that each implement an in-vehicle synthetic sensor orchestration environment, according to some embodiments.

FIG. 3 illustrates a synthetic sensor service that is configured to deploy a common synthetic sensor package to varying types of vehicles that each implement an in-vehicle synthetic sensor orchestration environment, according to some embodiments.

In some embodiments, input interfaces to synthetic sensor orchestration environments may be standardized such that the synthetic sensor orchestration environments are able to receive a common synthetic sensor package from a synthetic sensor service, while also interfacing with different communication interfaces of electronic sensors included in different types of vehicles. For example synthetic sensor service 102 may deploy a common synthetic sensor package 308 to each of multiple different types of vehicles such as car 302, a truck 304, and a van 306 that may be manufactured by different vehicle manufacturers and may include electrical sensors manufactured by different parts manufacturers.

Figure 4:
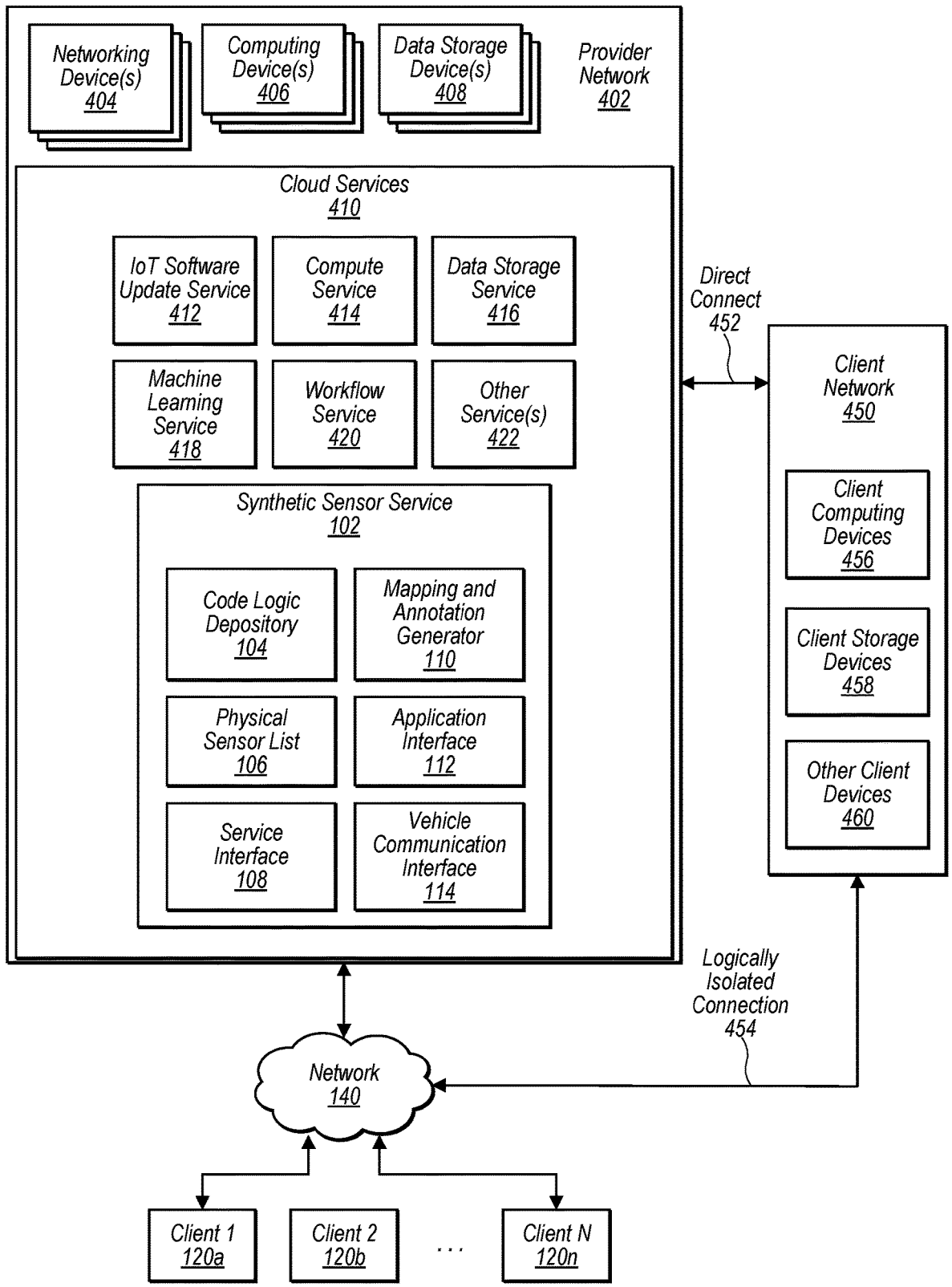
FIG. 4 illustrates an example provider network that includes a synthetic sensor service as well as other cloud services offered by the provider network, according to some embodiments.

FIG. 4 illustrates an example provider network that includes a synthetic sensor service as well as other cloud services offered by the provider network, according to some embodiments.

In some embodiments, a provider network, such as provider network 402, includes networking devices 404, computing devices 406, and data storage devices 408 that implement cloud services 410. In some embodiments, a provider network may implement a plurality of cloud services in addition to a synthetic sensor service. For example, provider network 402 implements cloud services 410 that include IoT software update service 412, compute service 414, data storage service 416, machine learning service 418, workflow service 420, and other services 422. Cloud services 410 also includes synthetic sensor service 102.

In some embodiments, an IoT software update service, such as IoT software update service 412, may facilitate software updates on devices connected to the IoT software update service, such as vehicles 124, 148, and 150 as illustrated in FIG. 1 or vehicles 302, 304, and 306 as illustrated in FIG. 3. In some embodiments, an IoT software update service may additionally update firmware on a connected device and may utilize encrypted communications to perform the update. In some embodiments, the IoT software update service may also include identity authentication protocols to prevent unauthorized entities from altering software on a connected device, such as a vehicle, and encrypt communications to the connected device to prevent alterations to the software updates.

In some embodiments, a compute service, such as compute service 414, may include computing devices that implement virtual compute machines that may be used to analyze collected vehicle usage information and/or may be used to implement a synthetic sensor service.

In some embodiments, a data storage service, such as data storage service 416, may include data storage devices that implement a virtualized data storage, such as virtual data storage volume or virtual storage containers for an objectbased storage. In some embodiments, a data storage service, such as data storage service 416, may be used to store collected vehicle usage information for a client. Also, in some embodiments, a data storage service, such as data storage service 416, may be used to implement components of a synthetic sensor service. For example, in some embodiments, code logic depository 104 and physical synthetic sensor list 106 may be implemented using virtual storage resources of data storage service 416.

In some embodiments, a machine learning service may execute one or more machine learning algorithms to determine relationships to be used in a synthetic sensor, to optimize a workflow service, or to optimize another service. For example, in some embodiments, a machine learning service, such as machine learning service 418, may be used to optimize software for a synthetic sensor and may utilize collected vehicle usage information from a synthetic sensor orchestration environment, such as synthetic sensor orchestration environment 140, to perform such machine learning or to produce machine learning inference outputs.

In some embodiments, a workflow service, such as workflow service 420, may execute a workflow based on input data and a stored or developed workflow. For example, in some embodiments, a workflow service, such as workflow service 420, may determine actions to be taken based on collected vehicle usage information. As an example, a workflow service may determine a filter, hose, or fluid needs to be changed or replaced based on applying collected vehicle usage information to one or more stored or developed work flows. In some embodiments, a machine learning service, such as machine learning service 418, may be used to develop or improve work flows executed by workflow service 420.

In some embodiments, cloud services 410 may include various other cloud services, such as other services 422.

In some embodiments, a synthetic sensor service may be configured to establish a secure connection to a client network for delivering data from a vehicle synthetic sensor service. For example, in some embodiments, an OEM may receive certain types of vehicle data for use in improving vehicle design and/or for use in developing new synthetic sensors. In some embodiments, a client network, such an OEM network may establish a secure connection to a synthetic sensor service via a direct connection, such as direct connect 452, or via a logically isolated network connection, such as logically isolated network connection 454. In some embodiments, a direct connection may include a dedicated physical network link that links the client network 450 to the provider network 410 and/or one or more logically isolated network connections within provider network 410 that route traffic from a router physically connected to the client network 450 via direct connect 452 to computing devices and/or storage devices that implement the synthetic sensor service 102. For example, connected car services 742, such as a data lake, as described in FIGS. 8-10 may be implemented using cloud services, such as compute service 414 and data storage service 416, or may be implemented directly by a client using client resources, such as client computing devices 456, client storage devices 458, or other client devices 460.

Figure 5:
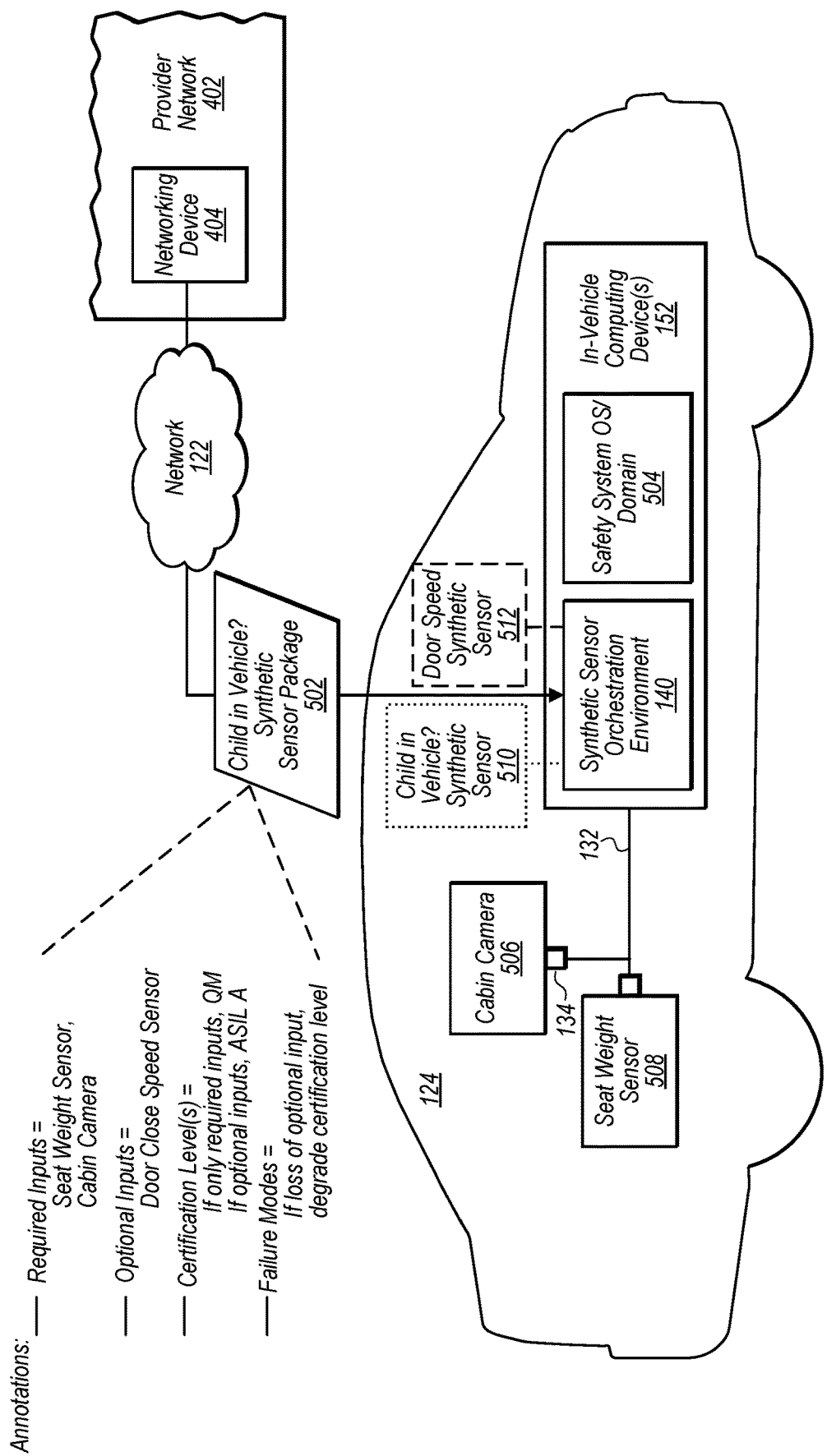
FIG. 5 illustrates an example deployment of a synthetic sensor package, according to some embodiments.

FIG. 5 illustrates an example deployment of a synthetic sensor package, according to some embodiments. In FIG. 5 a specific example of a deployment of a "child in vehicle?" synthetic sensor package is described to more generally illustrate how placement of a synthetic sensor package may be determined. However, similar concepts as described in FIG. 5 may apply to various other types of synthetic sensors being deployed.

For example, "child in vehicle?" synthetic sensor package 502 may be sent to in-vehicle computing device 152 via network 122. The "child in vehicle?" synthetic sensor package 502 may include code logic and mappings in an envelope as described in FIG. 2 and may further include annotations, such as required inputs, optional inputs, certification levels, failure contingency plans, etc. For example, annotations of "child in vehicle?" synthetic sensor package 502 may include required inputs of a seat weight sensor and a cabin camera. Optional inputs may include a door close speed sensor. Additionally, certification levels may indicate that a quality management or "QM" certification level is to be ascribed to the "child in vehicle?" synthetic sensor if only the required inputs are available, while an ASIL A certification level is to be ascribed to the "child in vehicle?" synthetic sensor if the optional input of a door close speed sensor is available. Additionally, the annotations may indicate that if the optional inputs are lost, the certification level for the "child in vehicle?" synthetic sensor is to be lowered from ASIL A to QM.

In some embodiments, the synthetic sensor orchestration environment 140 may read the annotations associated with "child in vehicle?" synthetic sensor package 502 and determine, based on the annotations, that "child in vehicle?" synthetic sensor package 502 is to be placed in safety operating system/domain 504 that has access to input data from seat weight sensor 508 and cabin camera 506. Additionally, synthetic sensor orchestration environment 140 may further recognize that "child in vehicle?" synthetic sensor package 502 has an optional input of a door close speed sensor and also recognize that door close speed synthetic sensor 512 is implemented in the synthetic sensor orchestration environment 140 associated with safety operating system/domain 504. Thus, the synthetic sensor orchestration environment may determine to place "child in vehicle?" synthetic sensor 510 in safety operating system/domain 504 as an ASIL A sensor. Furthermore, synthetic sensor orchestration environment 140 may further advertise to other synthetic sensors that a new ASIL A "child in vehicle?" synthetic sensor 510 has been implemented in safety operating system/domain 504.

In some embodiments, if multiple operating systems/domains have access to seat weight sensor 508 and cabin camera 506, a placement decision may be based on whether or not the operating systems/domains have access to the door close speed synthetic sensor 512. Furthermore, in the case that multiple operating systems/domains have access to both the required and optional inputs, a placement decision may be made based on a certification level of the hardware and algorithms associated with the respective domains. For example, to satisfy ASIL A certification a certain type of hardware and/or auditable code may be required. Thus, even if both required and optional inputs are available in multiple domains, a placement decision may be made based a certification level of the hardware and algorithms associated with a particular operating system/domain that allow the synthetic sensor being placed to achieve a higher certification level. In some embodiments, a placement decision may be based on whether placement of the synthetic sensor in a particular operating system/domain may enable existing synthetic sensors to achieve a higher certification level. For example, if the synthetic sensor package being placed was a door speed close synthetic sensor package, where the "child in vehicle?" synthetic sensor 510 had already been placed, a placement decision for the door speed close synthetic sensor 512 may have been based on the fact that placement in the safety system operating system/domain 504 would enable the "child in vehicle?" synthetic sensor 510 to be upgraded to a higher certification level. Note that these placement decisions may be made based on annotations associated with both already implemented synthetic sensors and annotations associated with a synthetic sensor package that is being placed.

Also, in some embodiments, a synthetic sensor package may specifically instruct a particular placement location for a synthetic sensor. For example, a vehicle OEM may include configuration instructions in a synthetic sensor package that instruct a synthetic sensor orchestration environment where to place the synthetic sensor.

FIG. 6 illustrates an example client console of a synthetic sensor service, according to some embodiments.

In FIG. 6 a "sensor access" tab has been selected that indicates existing physical sensors in an "OEM A" vehicle having the model years 2009, 2010, or 2011, with a particular operating system platform and trim levels. Also, as shown in FIG. 6, some sensor data from some sensors may be available to first party applications (e.g. OEM manufacturer applications), while sensor data from other sensors may be available to second party applications (e.g. OEM parts manufacturer applications), and sensor data from another set of sensors may be available in an automotive open system architecture (e.g. Auto SAR), a third party, such as an application developer that is not a first party OEM or a second party OEM parts manufacturer. For example, third party applications may be from an OEM's ecosystem of developers, or could be applications from an existing application store ecosystem of developers. Also, while not shown in FIG. 6, the system access tab may be selected to see which systems (e.g. safety system domain, entertainment domain, in-vehicle controls domain, etc.) can be accessed by the first party, second party, third party and/or Auto SAR applications. Additionally, the "compute unit control" tab may be selected to determine whether the first party, second party, third party and/or Auto SAR applications may interact with a computer controller in the respective domains. An interface such as shown in FIG. 6 may be used to select input sensors to drag and drop into a synthetic sensor definition as shown in FIG. 2.

Figure 7:
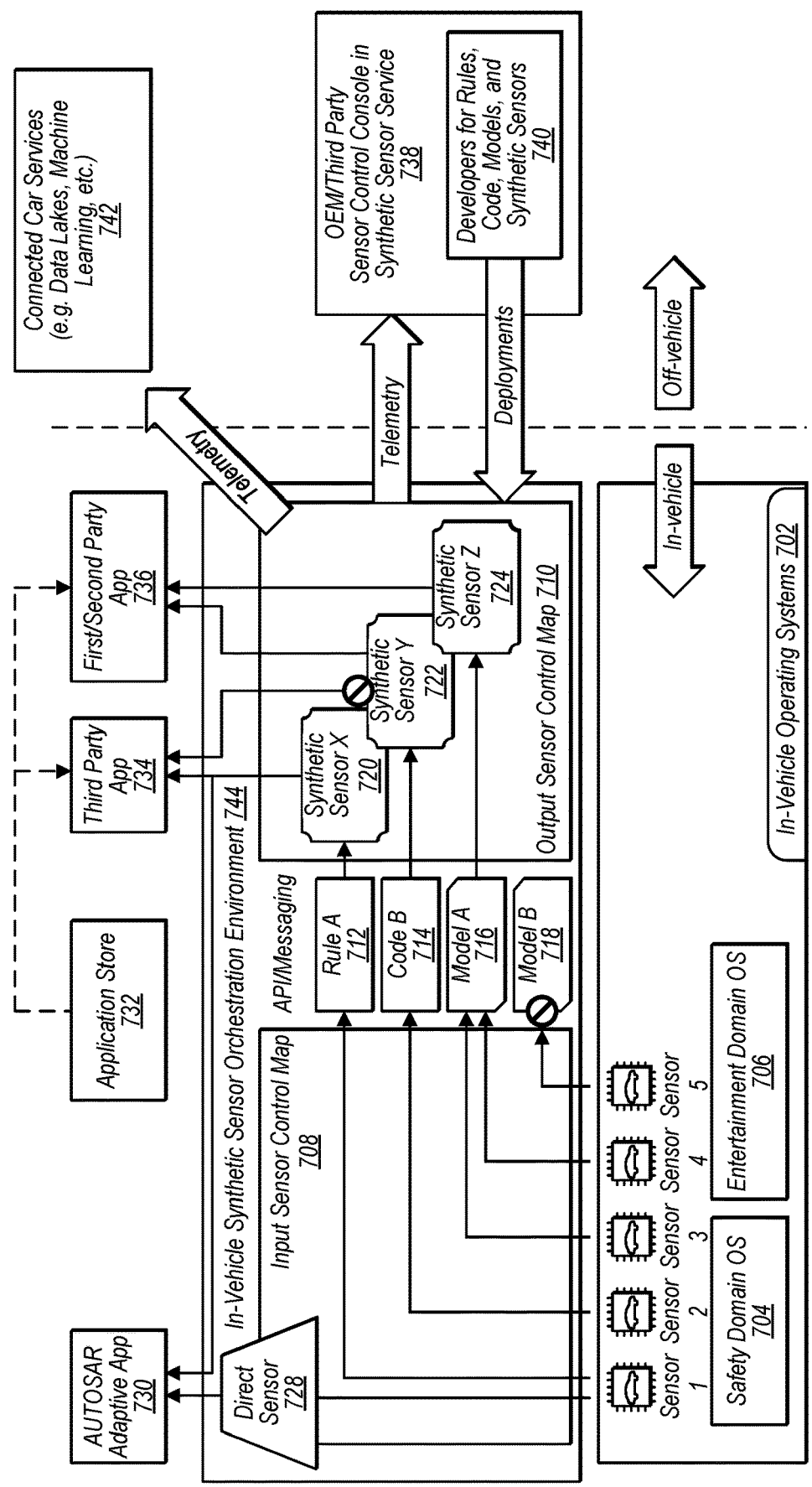
FIG. 7 illustrates an example view of a synthetic sensor orchestration environment, according to some embodiments.

FIG. 7 illustrates an example view of a synthetic sensor orchestration environment, according to some embodiments.

As discussed above, a synthetic sensor service, such as synthetic senor service 102, may include a service interface 108 that implements a console, such as OEM/third party sensor control console 738, which may enable developers of rules, algorithms, models, and synthetic sensors (740) to deploy such rules, algorithms, models and/or synthetic sensors into an in-vehicle synthetic sensor orchestration environment 744. Additionally, vehicle usage data such as telemetry may be provided back to the developers of rules algorithms, models, and synthetic sensors (740) and/or connected car services 742. For example, in some embodiments an application provided by developers of rules algorithms, models, and synthetic sensors (740) may be purchased from application store 732, which may cause third party application 734 or first/second party application 736 to be deployed in the vehicle. Additionally, the purchase from the application store may cause one or more synthetic sensors to be deployed to in-vehicle synthetic sensor orchestration environment 744, wherein the third-party application 734 or the first/second party application 735 takes an output of the synthetic sensor(s) as an input to the respective applications.

For example, synthetic sensor X (720), synthetic sensor Y (722) and synthetic sensor Z (724) may be deployed to in-vehicle synthetic sensor orchestration environment 744. Additionally, in some embodiments, rule A (712), code B (714), model A (716), and model B (718) may be deployed to the in-vehicle synthetic sensor orchestration environment 744. In some embodiments, a synthetic sensor packages may include code for synthetic sensor X (720), synthetic sensor Y (722) and synthetic sensor Z (724) along with mappings for input sensor control map 708 and output sensor control map 710 and/or may include code for rule A (712), code B (714), model A (716), and model B (718).

In some embodiments, third-party applications may not have authority to cause synthetic sensors to be deployed, but may instead request that a first or second party, such as a vehicle OEM, authorize deployment of a synthetic sensor needed for implementation of a third-party application. In some embodiments, an application when implemented in a vehicle may request access to inputs needed by the application using an input discovery module, such as input discovery module 904, which is further desired in FIG. 9. In such embodiments, the input discovery module may request additional synthetic sensors need for an application from an OEM, if the synthetic sensors are not already implemented in the synthetic sensor orchestration environment of the vehicle. In some embodiments, an OEM may select a particular type of synthetic sensor to implement in response to a request, which may differ from a particular type of synthetic sensor requested. For example, based on a vehicle package, or OEM preferences the OEM may select a different synthetic sensor to provide for use by the third-party application.

In some embodiments, an OEM client of a synthetic sensor service may control access to data from synthetic sensors. This may apply to synthetic sensors already deployed in a synthetic sensor orchestration environment of the vehicle and/or to new synthetic sensors that are being requested to be deployed to the vehicle. For example, even though synthetic sensor Y (722) is deployed in in-vehicle synthetic sensor orchestration environment 744, third party application 734 does not have access to the output of synthetic sensor Y (722), while first and second party applications 736 do have access to the output of synthetic sensor Y (722).

In some embodiments, input sensor control map 708 may map sensor data from sensors 1, 2, and 3 in safety system domain 704 to rule A (712), code B (714), and model A (716). Also, input sensor control map 708 may map sensor data from sensors 4 and 5 in entertainment system domain 706 to model A (716) and model B (718). However, in some situations, the sensor data may be prevented from flowing according to the mapping, based on code logic, or for other reasons such as failure to pay for the application. Thus, FIG. 7 shows sensor data from sensor 5 being disallowed to flow to model B (716) and an output of synthetic sensor Y (722) being disallowed from flowing to application 734.

Also, in some embodiments, a synthetic sensor may be a direct synthetic sensor that allows or disallows sensor data to flow to a particular destination. For example, direct sensor 728 may allow or disallow sensor data from sensor 1 to flow to an Auto SAR adaptive application 730.

Figure 8:
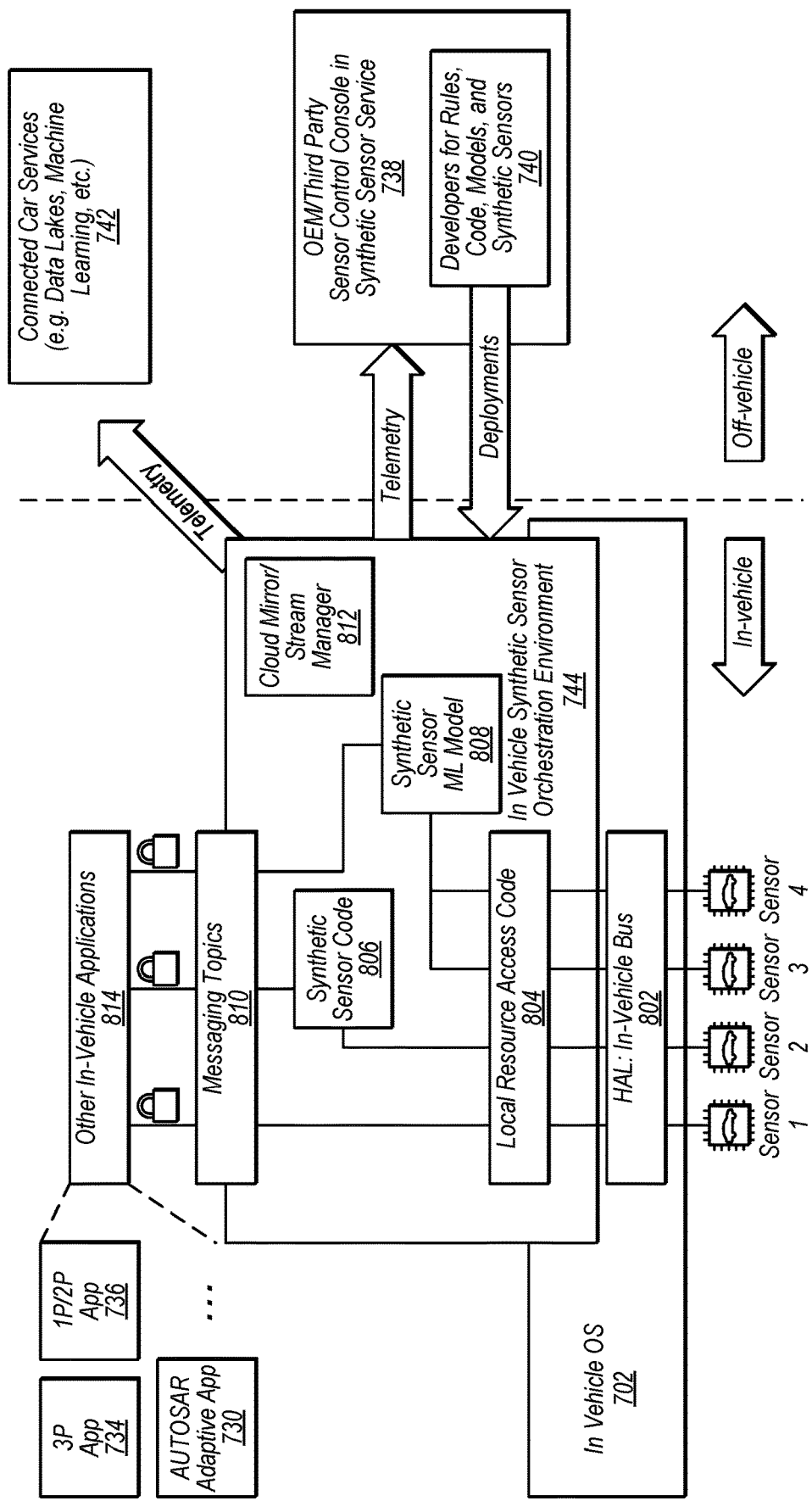
FIG. 8 illustrates an example view of a particular synthetic sensor implemented in a synthetic sensor orchestration environment that runs on top of an in-vehicle operating system, according to some embodiments.

FIG. 8 illustrates an example view of a particular synthetic sensor implemented in a synthetic sensor orchestration environment that runs on top of an in-vehicle operating system, according to some embodiments.

As shown in FIG. 8, in some embodiments an in-vehicle synthetic sensor orchestration environment 744 may be implemented on top of an in-vehicle operating system 702 that includes a hardware abstraction layer (HAL), in-vehicle bus 802, or both. The HAL or in-vehicle bus 802 may interface with a local resource access code component 804 of in vehicle synthetic sensor orchestration environment 744 and the local resource access code component 804 may allow or disallow sensor data from sensors 1, 2, 3, 4, or 5 to flow from the HAL or in-vehicle bus 802 to respective components of a synthetic sensor, such as synthetic sensor code 806 and synthetic sensor machine learning model 808. Additionally, messaging topics 810 may allow or disallow data to flow out of synthetic sensor orchestration environment 744 to other in-vehicle applications 814, such as third party applications 734, first/second party applications 736, and/or Auto SAR adaptive applications 730. In some embodiments, an in-vehicle synthetic sensor orchestration environment 744 may further include a cloud mirror/stream manager component 812 that mirrors or sends sensor data, such as telemetry, to connected car services 742. In some embodiments, connected car services may be implemented in a provider network that implements a synthetic sensor service (such as provider network 402 illustrated in FIG. 4) and/or may be implemented in a client network (such as at an OEM data center, such as client network 450 illustrated in FIG. 4).

In some embodiments, sensor data may be provided to a storage service, such as data storage service 416 (illustrated in FIG. 4), the sensor data may then be used by a machine learning service, such as machine learning service 418 (illustrated in FIG. 4). The machine learning service may determine relationships that may further be used to create new logic elements that may be added to code logic depository 104. The new logic elements may then be selected for use in new synthetic sensors.

Figure 9:
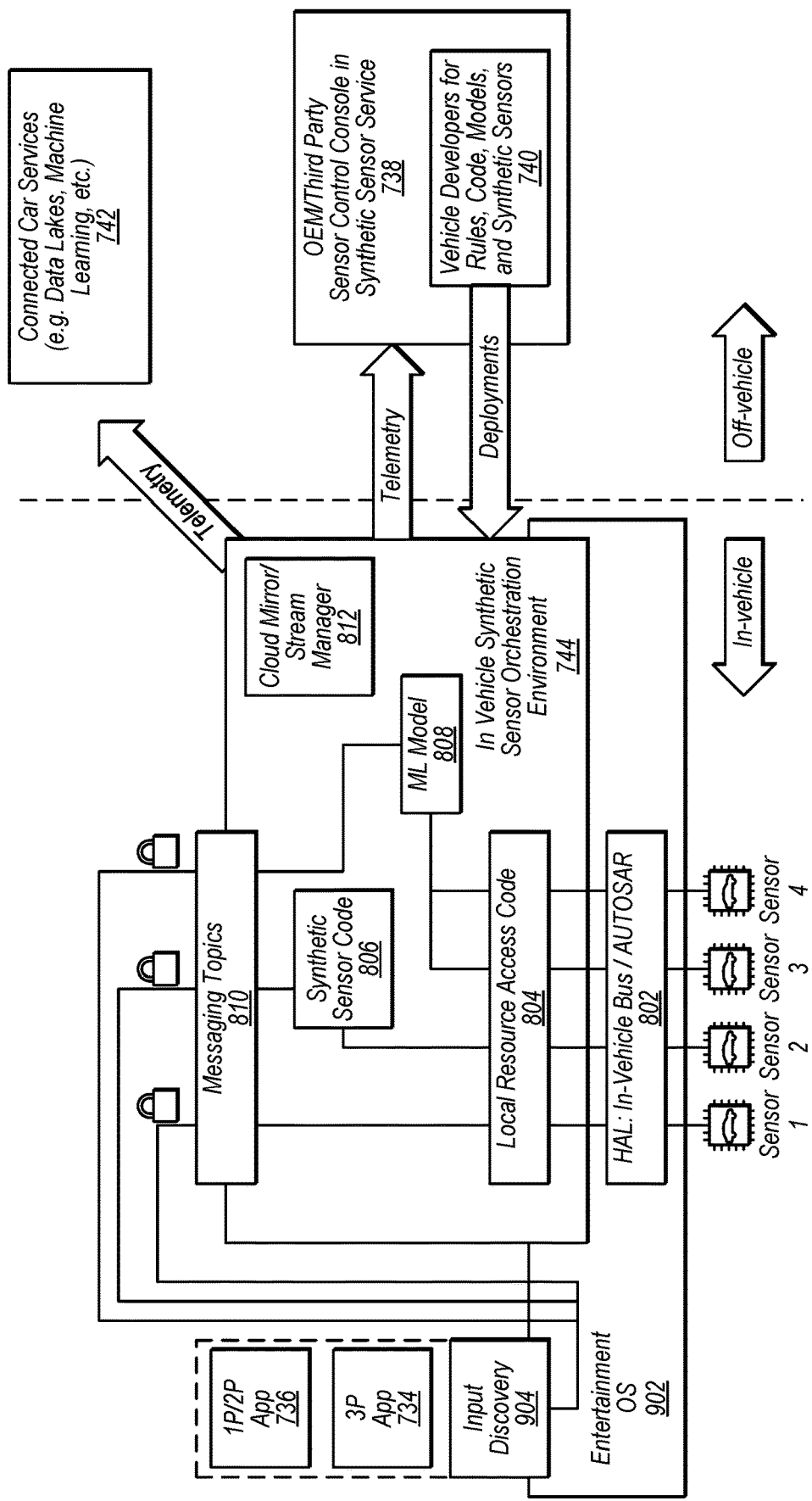
FIG. 9 illustrates an example view of a particular synthetic sensor implemented in a synthetic sensor orchestration environment that runs on top of an entertainment operating system of a vehicle, according to some embodiments.

FIG. 9 illustrates an example view of a particular synthetic sensor implemented in a synthetic sensor orchestration environment that runs on top of an entertainment operating system of a vehicle, according to some embodiments.

The in-vehicle synthetic sensor orchestration environment 744 illustrated in FIG. 9 may be similar to the in-vehicle synthetic sensor orchestration environment 744 illustrated in FIG. 8, except in FIG. 9 the in-vehicle synthetic sensor orchestration environment 744 is implemented on top of a entertainment system operating system 902 and uses an input discovery component 904 to communicate sensor data to third party applications 734 and/or first/second party applications 736 that are implemented in another domain other than the entertainment operating system domain 902.

Figure 10:
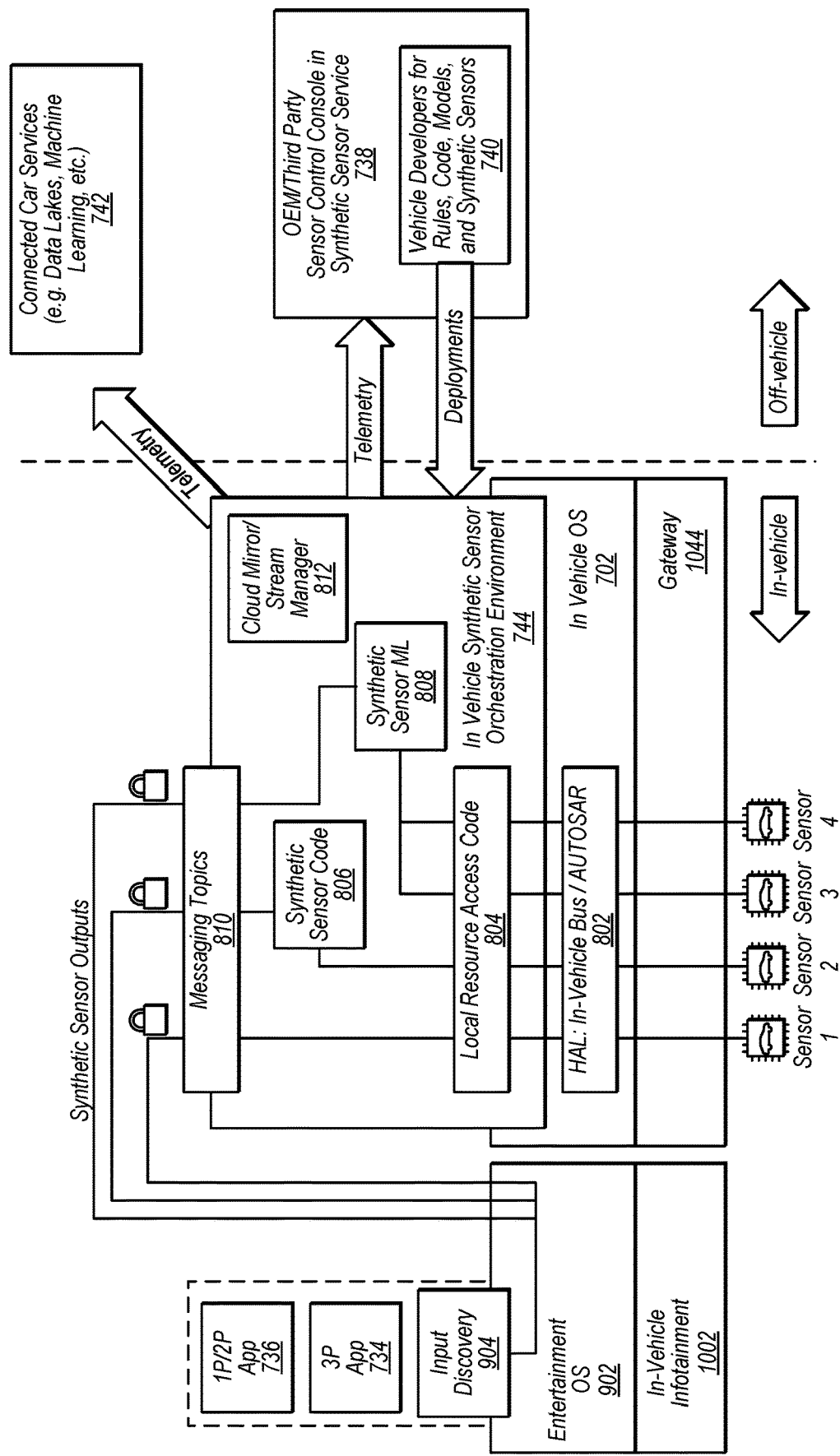
FIG. 10 illustrates an example view of a particular synthetic sensor implemented in a synthetic sensor orchestration environment that runs in a gateway between an in-vehicle operating system and an entertainment operating system of a vehicle, according to some embodiments.

FIG. 10 illustrates an example view of a particular synthetic sensor implemented in a synthetic sensor orchestration environment that runs in a gateway between an in-vehicle operating system and an entertainment operating system of a vehicle, according to some embodiments.

The in-vehicle synthetic sensor orchestration environment 744 illustrated in FIG. 10 may be similar to the in-vehicle synthetic sensor orchestration environment 744 illustrated in FIG. 8 or 9, except in FIG. 10 the in-vehicle synthetic sensor orchestration environment 744 is implemented on top of in-vehicle operating system 702 implemented in a gateway 1044 and uses an input discovery component 904 to communicate sensor data to third party applications 734 and/or first/second party applications 736 that are implemented in an entertainment operating system 902 implemented on an in-vehicle infotainment computing device 1002. In some embodiments, gateway 1044 and in-vehicle infotainment 1002 may be separate computing devices that respectively implement the in-vehicle operating system 702 and the entertainment system operating system 902.

Figure 11:
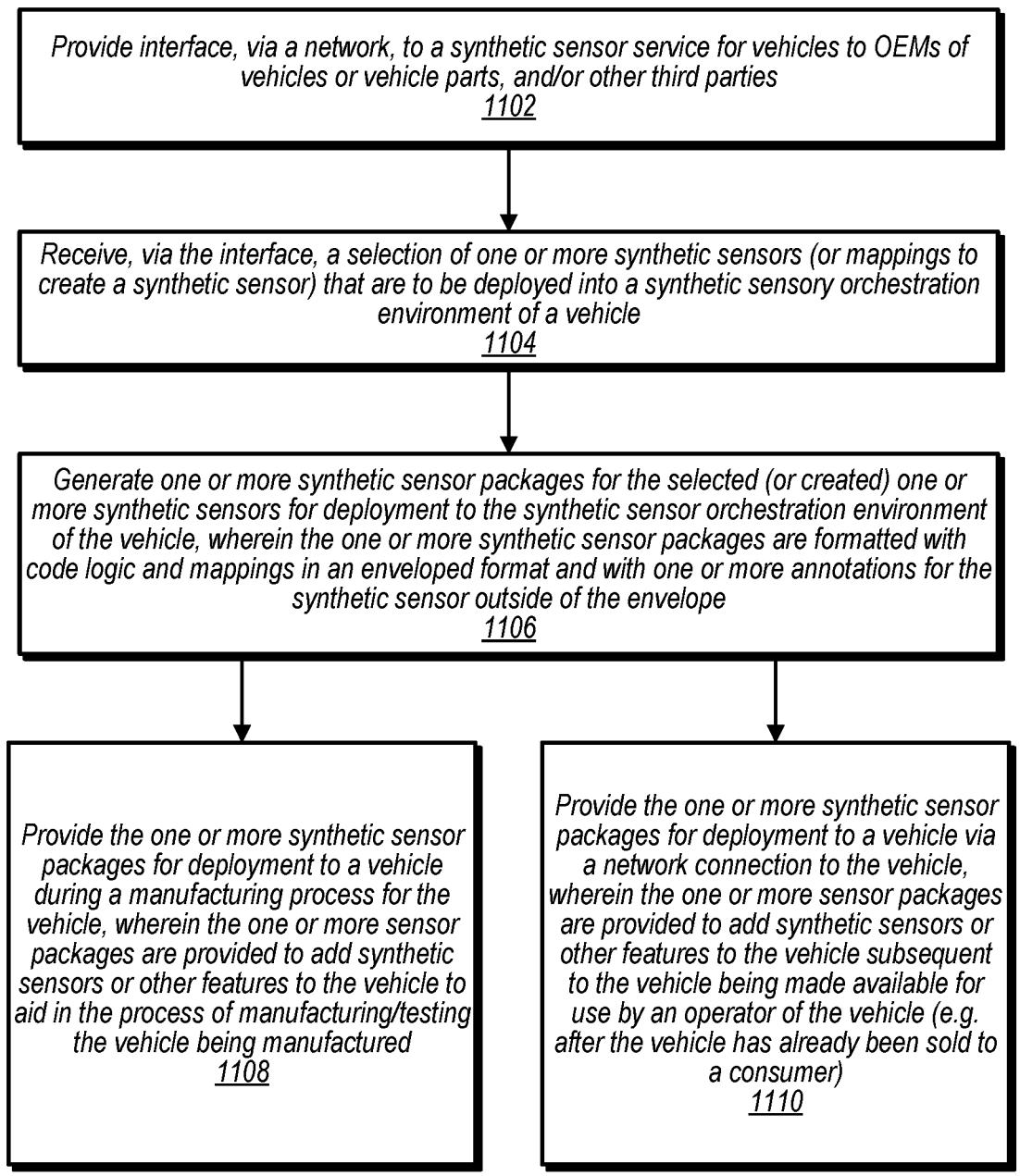
FIG. 11 illustrates a flowchart for operations of a synthetic sensor service, according to some embodiments.

FIG. 11 illustrates a flowchart for operations of a synthetic sensor service, according to some embodiments.

At 1102, a synthetic sensor service provides an interface to vehicle manufacturers, parts manufacturers, or other third parties. The interface may enable the clients of the synthetic sensor service to design new types of synthetic sensors. The interface may also be used to cause particular types of synthetic sensors, such as those designed by the clients, to be deployed to particular vehicles. In some embodiments, the interface may provide an API for an application store to automatically cause synthetic sensor packages to be deployed to particular vehicles in response to an application being purchased for the particular vehicle that uses the synthetic sensor.

At 1104, the synthetic sensor service receives, via the interface, a selection of one or more synthetic sensors (or mappings to create a synthetic sensor) that are to be deployed into a synthetic sensory orchestration environment of a vehicle.

At 1106, the synthetic sensor service generates one or more synthetic sensor packages for the selected (or created) one or more synthetic sensors for deployment to the synthetic sensor orchestration environment of the vehicle, wherein the one or more synthetic sensor packages are formatted with code logic and mappings in an enveloped format and with one or more annotations for the synthetic sensor outside of the envelope.

At 1108, the synthetic sensor service provides the one or more synthetic sensor packages for deployment to a vehicle for deployment during a manufacturing process of the vehicle. In some embodiments, the one or more synthetic sensors associated with the one or more synthetic sensor packages may aid in the process of manufacturing and/or testing the vehicle being manufactured. In some embodiments, the one or more synthetic sensor packages may be deployed during the manufacturing process after the vehicle has power (e.g. has a battery installed), has an in-vehicle computer installed in the vehicle, and has a wiring harness attached to the in-vehicle computer. In some embodiments, the one or more sensors associated with the one or more synthetic sensor packages may run quality assurances models to check the quality of installed physical sensors and computing systems. In some embodiments, the synthetic sensors may be released from the synthetic sensor orchestration environment upon the vehicle passing the quality assurance testing.

At 1110, the synthetic sensor service provides the one or more synthetic sensor packages for deployment to a vehicle via a network connection to the vehicle, wherein the one or more sensor packages are provided to add synthetic sensors or other features to the vehicle subsequent to the vehicle being made available for use by an operator of the vehicle (e.g. after the vehicle has already been sold to a consumer).

In some embodiments, a synthetic sensor service may perform both 1108 and 1110 for a vehicle, or may only perform one, but not the other.

Figure 12:
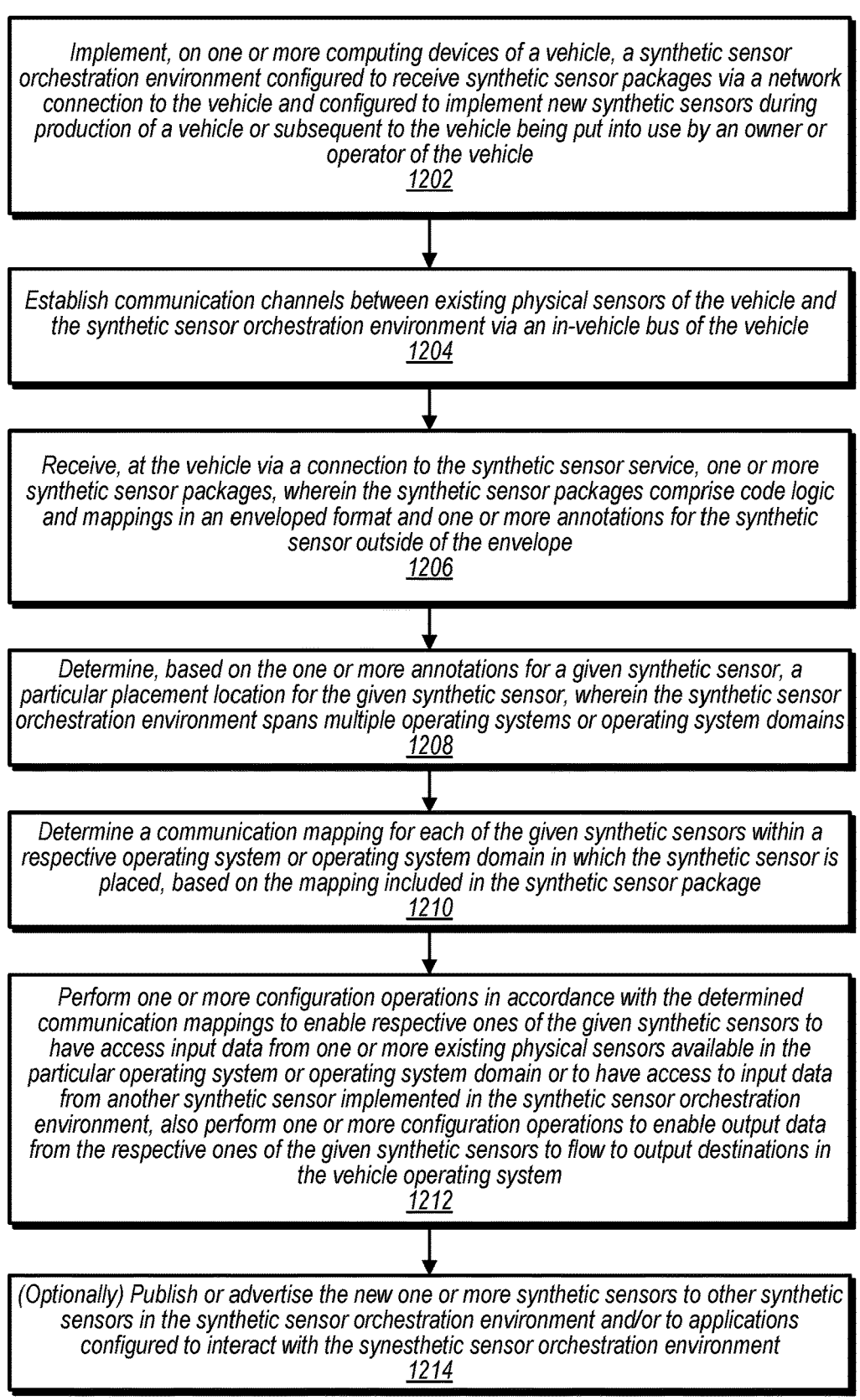
FIG. 12 illustrates a flowchart for operations of an in-vehicle synthetic sensor orchestration environment, according to some embodiments.

FIG. 12 illustrates a flowchart for operations of an in-vehicle synthetic sensor orchestration environment, according to some embodiments.

At 1202, an in-vehicle computer device of a vehicle implements a synthetic sensor orchestration environment configured to receive synthetic sensor packages via a network connection to the vehicle and configured to implement new synthetic sensors subsequent to the vehicle being put into use by an owner or operator of the vehicle or during a manufacturing process for the vehicle. In some embodiments, the synthetic sensor orchestration environment may be implemented on its own separate computing device, or may implemented on a computing device that also implements an in-vehicle operating system, a computing device that implements an infotainment system, a gateway computing device that provides a gateway between operating systems/domains of a vehicle such as a gateway between an in-vehicle operating system computing device and an infotainment computing device.

At 1204, the synthetic sensor orchestration environment establishes communication channels between existing physical sensors of the vehicle and the synthetic sensor orchestration environment via an in-vehicle bus of the vehicle.

At 1206, the synthetic sensor orchestration environment receives, at the vehicle via the network connection to the synthetic sensor service or via a local production network in a manufacturing site, one or more synthetic sensor packages, wherein the synthetic sensor packages comprise code logic and mappings in an enveloped format and one or more annotations for the synthetic sensor outside of the envelope.

At 1208, the synthetic sensor orchestration environment determines based on the one or more annotations for a given synthetic sensor, a particular placement location for the given synthetic sensor, wherein the synthetic sensor orchestration environment spans multiple operating systems or operating system domains. The synthetic sensor orchestration environment may repeat said determining for each of the synthetic sensor packages being deployed.

At 1210, the synthetic sensor orchestration environment determines a communication mapping for each of the given synthetic sensors within a respective operating system or operating system domain in which the synthetic sensor is placed, based on the mapping included in the synthetic sensor package.

At 1212, the synthetic sensor orchestration environment performs one or more configuration operations in accordance with the determined communication mappings to enable respective ones of the given synthetic sensors to have access input data from one or more existing physical sensors available in the particular operating system or operating system domain or to have access to input data from another synthetic sensor implemented in the synthetic sensor orchestration environment. The synthetic sensor orchestration environment also performs one or more configuration operations to enable output data from the respective ones of the given synthetic sensors to flow to output destinations in the vehicle domains, and to service interfaces such as service interface 108 in FIG. 1 that exist on a cloud or in a customer's data center, such as other synthetic sensors applications, etc.

At 1214, the synthetic sensor orchestration environment optionally publishes or advertises the new one or more synthetic sensors to other synthetic sensors in the synthetic sensor orchestration environment and/or to applications configured to interact with the synesthetic sensor orchestration environment. Also, the synthetic sensor orchestration environment may advertise the new one or more synthetic sensors to applications. For example, the synthetic sensor orchestration environment may include an input discovery module 904 as described in FIG. 9 to alert applications to the existence of the e new one or more synthetic sensors.

Figure 13:
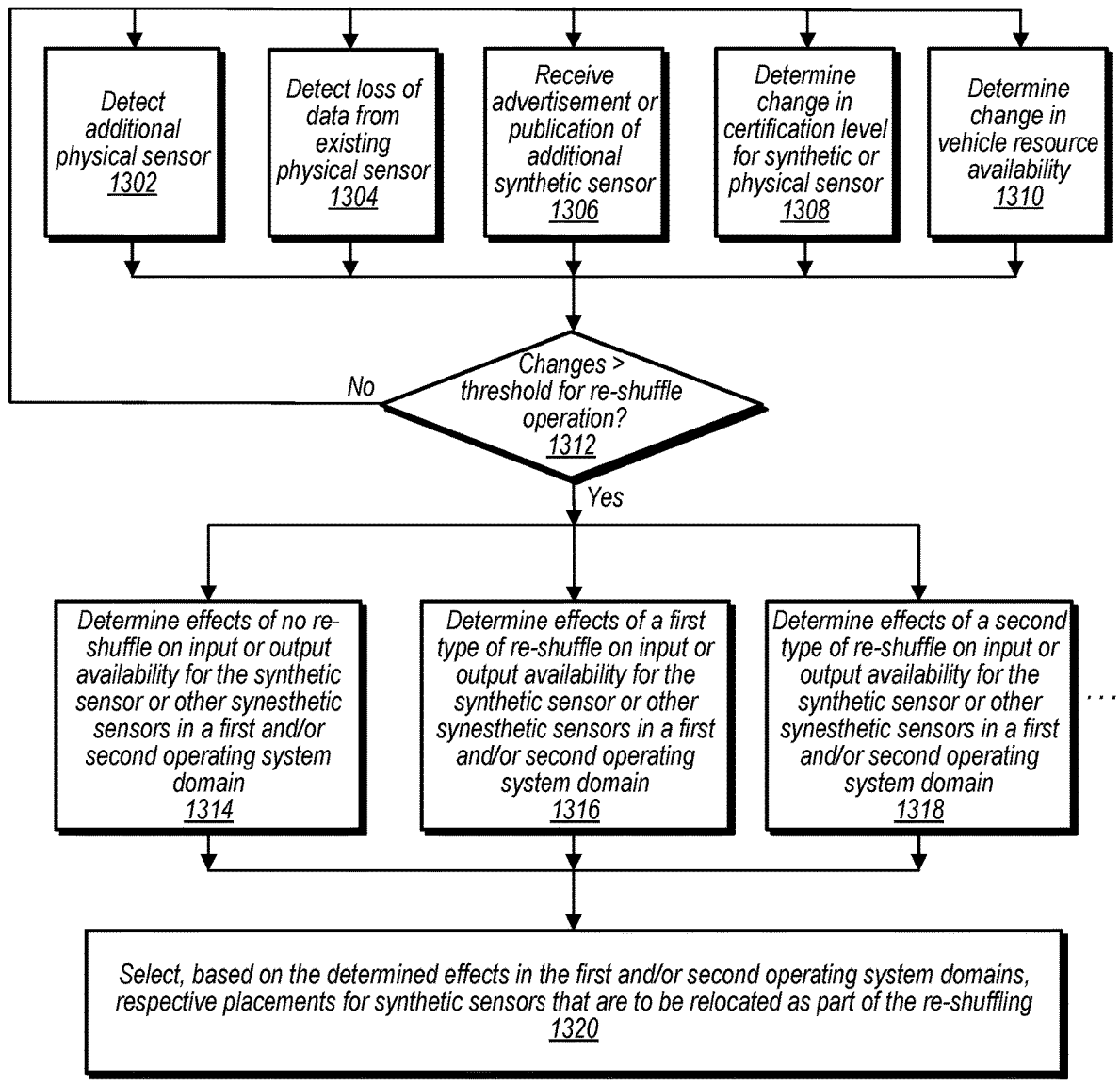
FIG. 13 illustrates a process for re-shuffling synthetic sensor placements amongst two or more operating systems or operating system domains of a vehicle in response to changes in the operating systems or operating system domains, according to some embodiments.

FIG. 13 illustrates a process for re-shuffling synthetic sensor placements amongst two or more operating systems or operating system domains of a vehicle in response to changes in the operating systems or operating system domains, according to some embodiments.

At 1302, the synthetic sensor orchestration environment detects whether an additional physical sensor has been added to the vehicle and connected to a communications bus of the vehicle.

At 1304, the synthetic sensor orchestration environment detects whether communications from an existing physical sensor over a communication bus of the vehicle have been lost.

At 1306, the synthetic sensor orchestration environment receives an advertisement or publication of additional synthetic sensor that has been deployed into one or more domains of the synthetic sensor orchestration environment.

At 1308, the synthetic sensor orchestration environment determines whether or not one or more changes in certification level have taken place for a synthetic sensor implemented in the synthetic sensor orchestration environment or in related to a physical sensor that shares sensor data with the synthetic sensor orchestration environment.

At 1310, the synthetic sensor orchestration environment determines/detects a change in vehicle resource availability, such as changes in computing capacity in one or more domains of the vehicle. For example, a change resulting in extra computing capacity in a particular domain may justify re-locating a synthetic sensor to the domain with extra computing capacity, or along with other considerations may justify such a change in placement.

At 1312, the synthetic sensor orchestration environment determines whether a number or importance of the changes taken place at 1302, 1304, 1306, 1308, or 1310 exceed one or more threshold to cause a re-shuffle operation to be performed. In a re-shuffle operation, the synthetic sensor orchestration environment may re-evaluate placements of already implemented synthetic sensor to determine if placing one or more of the already implemented synthetic sensors in a different domain would improve system performance, increase certifications levels of the synthetic sensors, or otherwise provide better performance. If the one or more threshold have not been exceeded at 1312, the synthetic sensor orchestration environment continues to monitor for additional changes.

If the one or more thresholds are exceeded at 1312, at 1314 through 1318, the synthetic sensor orchestration environment determines effects of relocating one or more already implemented synthetic sensors to different domains. For example, re-locating synthetic sensors may provide optional inputs to a re-located synthetic sensor or to a synthetic sensor in a domain into which a synthetic sensor is already implemented. Such additional optional inputs may allow at least some of the synthetic sensors to be upgraded to a higher certification level.

At 1320, the synthetic sensor orchestration environment selects based on the determined effects respective placements for synthetic sensors that are to be relocated as part of the re-shuffling.

Example Computer System

Figure 14:
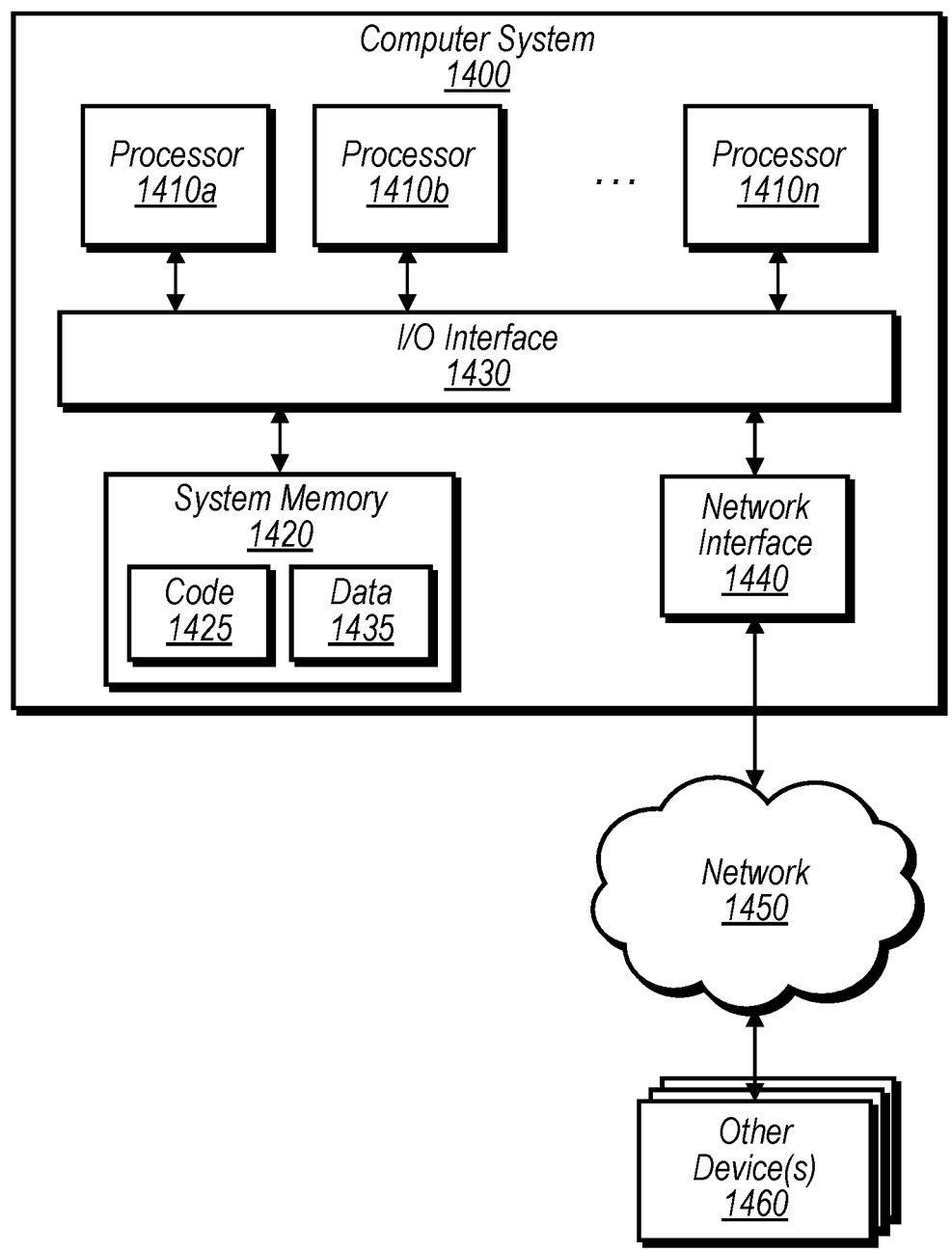
FIG. 14 is a block diagram illustrating an example computer system that implements some or all of the techniques described herein, according to some embodiments.

Any of various computer systems may be configured to implement processes associated with a synthetic sensor service, a synthetic sensor orchestration environment, a provider network that implement a synthetic sensor service, an operating system in a vehicle or device, or any other component of the above figures. For example, FIG. 14 is a block diagram illustrating an example computer system that implements some or all of the techniques described herein, according to some embodiments. In various embodiments, the synthetic sensor service, synthetic sensor orchestration environment, the provider network that implement the synthetic sensor service and other cloud services, the operating system in a vehicle or device, or any other component of the above figures FIGS. 1-13 may each include one or more computer systems 1400 such as that illustrated in FIG. 14.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430. In some embodiments, computer system 1400 may be illustrative of servers implementing enterprise logic or downloadable application, while in other embodiments servers may include more, fewer, or different elements than computer system 1400.

In various embodiments, computing device 1400 may be a uniprocessor system including one processor or a multiprocessor system including several processors 1410A-1410N (e.g., two, four, eight, or another suitable number). Processors 1410A-1410N may include any suitable processors capable of executing instructions. For example, in various embodiments, processors 1410A-1410N may be processors implementing any of a variety of instruction set architectures (ISAs), such as the x86, PowerPC, SPARC, or MIPS ISAs, or any other suitable ISA. In some embodiments, processors 1410A-1410N may include specialized processors such as graphics processing units (GPUs), application specific integrated circuits (ASICs), etc. In multiprocessor systems, each of processors 1410A-1410N may commonly, but not necessarily, implement the same ISA.

System memory 1420 may be configured to store program instructions and data accessible by processor(s) 1410A-1410N. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1420 as code (i.e., program instructions) 1425 and data 1426.

In one embodiment, I/O interface 1430 may be configured to coordinate I/O traffic between processors 1410A-1410N, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, I/O interface 1430 may include support for devices attached via an automotive CAN bus, etc. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processors 1410A-1410N.

Network interface 1440 may be configured to allow data to be exchanged between computing device 1400 and other devices 1460 attached to a network or networks 1450. In various embodiments, network interface 1440 may support communication via any suitable wired or wireless general data networks, such as types of Ethernet networks, cellular networks, Bluetooth networks, Wi-Fi networks, Ultra-wideband Networks, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1400 via I/O interface 1430. One or more non-transitory computer-readable storage media may also include any volatile or nonvolatile media such as RAM (e.g. SDRAM, DDR SDRAM, RDRAM, SRAM, etc.), ROM, etc., that may be included in some embodiments of computing device 1400 as system memory 1420 or another type of memory. Further, a computer-readable medium may include transmission media or signals such as electrical, electromagnetic, or digital signals, conveyed via a communication medium such as a network and/or a wireless link, such as may be implemented via network interface 1440. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system comprising:
one or more computing devices, configured to be installed in a vehicle, wherein the one or more computing devices store program instructions for implementing a synthetic sensor orchestration environment in the vehicle, wherein the synthetic sensor orchestration environment is configured to:
receive, from a synthetic sensor service, a synthetic sensor package comprising:
one or more logic elements and mappings for a synthetic sensor; and
one or more annotations defining inputs, outputs, or attributes of the synthetic sensor,
wherein the one or more logic elements and mappings are included in an enveloped format with the one or more annotations outside of an envelope of the synthetic sensor package;
determine, based on the one or more annotations, a particular placement location for the synthetic sensor; and
perform one or more configuration operations to enable the synthetic sensor to have access to input data from one or more of:
a physical sensor; or
another synthetic sensor of the vehicle.

2. The system of claim 1, wherein the one or more annotations of the synthetic sensor package comprise one or more of:
an indication of a certification level for the synthetic sensor;
an indication of one or more required inputs for the synthetic sensor;
an indication of one or more additional inputs for the synthetic sensor;
an indication of an output type of the synthetic sensor; or
an indication of a quality level or confidence level of an output of the synthetic sensor.

3. The system of claim 2, wherein the one or more annotations for the synthetic sensor package further comprise one or more of:
a dependency chain indicating other synthetic sensors from which the synthetic sensor is to receive one or more inputs; or
a failure contingency plan indicating:
one or more alternative inputs to be used for the synthetic sensor if a primary input is unavailable; or
a downgraded certification level to be used for the synthetic sensor if a number or type of primary inputs are unavailable.

4. The system of claim 1, wherein the synthetic sensor orchestration environment is further configured to:
automatically relocate the synthetic sensor to another placement location in response to a change in the sensor orchestration environment.

5. The system of claim 4, wherein the change in the sensor orchestration environment comprises one or more of:
an addition of another synthetic sensor;
a change in availability of an additional input to the synthetic sensor;
a modification of a certification level of the synthetic sensor; or
a change in resource availability at the placement location or a change in resource availability at an alternative placement location.

6. The system of claim 4, wherein the placement location comprises one or more of:
an infotainment domain;
a vehicle safety system domain;
a gateway domain between one or more other domains of the vehicle; or
a cloud domain outside of the vehicle.

7. The system of claim 6, wherein to determine the placement location for implementing the synthetic sensor, or to automatically relocate the synthetic sensor to a different placement location, the synthetic sensor orchestration environment is configured to:
determine effects on input or output availability for the synthetic sensor or other synthetic sensors in a first placement location, if the synthetic sensor were to be placed in the first placement location, wherein the effects are determined based on the one or more annotations of the synthetic sensor or based on one or more annotations of the other synthetic sensors in the first placement location;
determine effects on input or output availability for the synthetic sensor or other synthetic sensors in a second placement location, if the synthetic sensor were to be placed in the second placement location, wherein the effects are determined based on the one or more annotations of the synthetic sensor or based on one or more annotations of the other synthetic sensors in the second placement location; and
select, based on the determined effects in the first and second placement locations, a placement for the synthetic sensor in one of the first or second placement locations.

8. The system of claim 1, wherein the synthetic sensor orchestration environment is configured to:
allow or disallow access to sensor data from physical sensors of the vehicle without modifying the physical sensors and without modifying logic outside of the synthetic sensor environment that uses data from the physical sensors to perform certified functions, such that a certification level of the physical sensors and a certification level of the logic outside of the synthetic sensor orchestration environment is not degraded by the addition or deletion of synthetic sensors in the synthetic sensor orchestration environment.

9. The system of claim 1, wherein the synthetic sensor orchestration environment is configured to:
receive a direct synthetic sensor package comprising code for a direct sensor configured to allow or disallow a flow of sensor data from a physical sensor in the vehicle; and
perform one or more configuration operations to enable the direct synthetic sensor to have access to input data from the physical sensor of the vehicle and perform one or more configuration operations to enable or disable sensor data from the physical sensor to flow through the direct synthetic sensor to one or more particular destinations.

10. The system of claim 1, wherein the synthetic sensor environment is configured to:
receive another synthetic sensor package comprising one or more logic elements and mappings for another synthetic sensor and one or more annotations for the other synthetic sensor, wherein the one or more logic elements and the mappings are included in an enveloped format with the one or more annotations outside of an envelope of the other synthetic sensor package, wherein the one or more annotations indicate that an output of the synthetic sensor is an input to the other synthetic sensor;

determine, based on the one or more annotations, a particular placement location for implementing the other synthetic sensor; and perform one or more configuration operations to enable the synthetic sensor to have access to input data from the other synthetic sensor and one or more other synthetic or physical sensors of the vehicle.

11. The system of claim 1, wherein the synthetic sensor environment is configured to:

receive another synthetic sensor package comprising one or more logic elements and mappings for another synthetic sensor and one or more annotations for the other synthetic sensor, wherein the one or more logic elements and the mappings are included in an enveloped format with the one or more annotations outside of the envelope of the other synthetic sensor;

determine, based on the one or more annotations for the other synthetic sensor, a particular placement location for implementing the other synthetic sensor; and perform one or more configuration operations to enable the other synthetic sensor to have access to input data from one or more other synthetic or physical sensors of the vehicle, wherein the one or more annotations of the synthetic sensor indicate that the other synthetic sensor is an additional input for the synthetic sensor, and wherein the synthetic sensor environment is further configured to:

automatically perform, in response to implementation of the other synthetic sensor, one or more configuration operations to enable the synthetic sensor to have access to an output of the other synthetic sensor.

12. The system of claim 11, wherein:

the one or more annotations of the synthetic sensor package indicate that the synthetic sensor qualifies for a different certification level when the additional input for the synthetic sensor is available; and the synthetic sensor orchestration environment is configured to automatically update the certification level associated with the synthetic sensor subsequent to performing the one or more configuration operations to enable the synthetic sensor to have access to an output of the other synthetic sensor.

13. The system of claim 1, wherein the synthetic sensor orchestration environment is configured to:

publish or advertise one or more characteristics of the synthetic sensor indicated in the one or more annotations to other destinations in the synthetic sensor orchestration environment.

14. The system of claim 1, wherein the synthetic sensor orchestration environment is further configured to:

provide an output from the synthetic sensor to a vehicle system outside of the synthetic sensor orchestration environment, wherein the output causes the vehicle system to take one or more control actions based on the output.

15. The system of claim 1, wherein the synthetic sensor orchestration environment is further configured to:

provide an output from the synthetic sensor to a remote system outside of the vehicle.

16. A system comprising:

one or more computing devices storing program instructions for implementing a synthetic sensor service for vehicles, wherein the program instructions when executed by the one or more computing devices:

implement an interface for receiving instructions for one or more synthetic sensors to be deployed to a vehicle;

receive, via the interface, instructions for one or more synthetic sensors to be deployed to the vehicle, wherein the interface indicates, for the one or more synthetic sensors, a mapping that maps the one or more synthetic sensors to one or more existing physical sensors or other synthetic sensors of the vehicle; and provide, based on the received instructions, one or more synthetic sensor packages for deployment to a synthetic sensor orchestration environment of the vehicle, wherein the provided one or more synthetic sensor packages comprise code defining the one or more synthetic sensors and one or more respective annotations defining inputs, outputs, or attributes of the respective one or more synthetic sensors, wherein the code is included in an enveloped format with the one or more annotations outside of a code envelope.

17. The system of claim 16, wherein the synthetic sensor service is configured to provide the one or more synthetic sensor packages to the vehicle:

subsequent to the vehicle being made available for use by an owner or operator of the vehicle; or during a manufacturing process of the vehicle subsequent to installation in the vehicle of one or more computing devices storing program instructions for implementing the synthetic sensor orchestration environment, wherein the one or more synthetic sensors are configured to generate outputs used to test the vehicle during the manufacturing process.

18. The system of claim 16, further comprising:

one or more computing devices, located in the vehicle, storing program instructions for implementing at least a portion of the synthetic sensor orchestration environment, wherein the synthetic sensor orchestration environment is configured to:

receive the provided one or more synthetic sensor packages each comprising the one or more respective annotations;

determine, based on the one or more respective annotations, a particular placement location for the one or more synthetic sensors; and for each of the one or more synthetic sensors:

assign the respective synthetic sensor to the determined placement location;

perform one or more configuration operations to enable the synthetic sensor to have access to input data from the one or more existing physical sensors or other synthetic sensors of the vehicle according to the mapping; and perform one or more configuration operations to provide output data from the synthetic sensor to one or more output destinations in the operating system environment of the vehicle or one or more other destinations outside of the operating system environment of the vehicle.

19. The system of claim 18, further comprising computing devices, in a plurality of additional vehicles, storing program instructions for implementing at least portions of additional synthetic sensor orchestration environments in the plurality of additional vehicles,
- wherein the plurality of additional vehicles include vehicles manufactured by two or more different vehicle manufacturers or different vehicle platforms manufactured by a same vehicle manufacturer, and
- wherein the synthetic sensor service for vehicles provides a standard interface for selecting synthetic sensors to be deployed into any of the plurality of additional vehicles manufactured by the two or more different vehicle manufacturers, wherein existing physical sensors in different ones of the plurality of additional vehicles manufactured by the two or more different manufacturers have different interface formats for communicating with the existing physical sensors.

20. The system of claim 16, wherein the interface is configured to:
- receive, from a manufacturer of the vehicle, instructions for a synthetic sensor comprising logic for an additional feature to be deployed to the vehicle during a manufacturing process of the vehicle or subsequent to the vehicle being made available for use by the operator of the vehicle; or
- receive, from a third party, instructions for a synthetic sensor comprising logic for an additional feature to be deployed to the vehicle during a manufacturing process of the vehicle or subsequent to the vehicle being made available for use by the operator of the vehicle.

21. One or more non-transitory, computer-readable storage media, storing program instructions that, when executed on or across one or more computing devices, cause the one or more computing devices to:
- receive a synthetic sensor package comprising one or more logic elements and mappings for a synthetic sensor and one or more annotations defining inputs, outputs, or attributes of the synthetic sensor, wherein the one or more logic elements and mappings are included in an enveloped format with the one or more annotations outside of an envelope of the synthetic sensor;
- determine, based on the one or more annotations, a particular placement location for implementing the synthetic sensor; and
- perform one or more configuration operations to enable the synthetic sensor to have access to input data from one or more physical sensors or synthetic sensors of the vehicle at the placement location.

22. The one or more non-transitory, computer readable storage media of claim 21, wherein the mappings of the synthetic sensor comprise a mapping of one or more inputs to the synthetic sensor to the one or more logic elements, wherein the one or more logic elements comprise one or more of:
- a rule to be applied based on the one or more inputs;
- an algorithm that uses the one or more inputs to determine one or more algorithm outputs; or
- a machine learning model that uses the one or more inputs to determine an output of the machine learning model.

23. The one or more non-transitory, computer readable media of claim 22, wherein the mapping of the received synthetic sensor indicates a logical mapping for required or additional inputs to the rule, the algorithm, or the machine learning model, and
- wherein the instructions, when executed on or across the one or more computing devices further cause the one or more computing devices to:
- determine a communication mapping between the rule, the algorithm, or the machine learning model of the synthetic sensor implemented in the particular placement location and other physical or synthetic sensors included in the particular placement location.

\* \* \* \* \*